United States Patent
Ochi et al.

(10) Patent No.: US 9,784,207 B2
(45) Date of Patent: Oct. 10, 2017

(54) CONTROL APPARATUS FOR INTERNAL COMBUSTION ENGINE

(71) Applicant: TOYOTA JIDOSHA KABUSHIKI KAISHA, Toyota-shi, Aichi (JP)

(72) Inventors: Yuta Ochi, Susono (JP); Toshimi Kashiwagura, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/112,245

(22) PCT Filed: Jan. 16, 2015

(86) PCT No.: PCT/JP2015/000177
§ 371 (c)(1),
(2) Date: Jul. 18, 2016

(87) PCT Pub. No.: WO2015/111392
PCT Pub. Date: Jul. 30, 2015

(65) Prior Publication Data
US 2016/0333818 A1     Nov. 17, 2016

(30) Foreign Application Priority Data

Jan. 22, 2014    (JP) ................................ 2014-009488

(51) Int. Cl.
*F02D 41/40* (2006.01)
*F02D 41/30* (2006.01)
(Continued)

(52) U.S. Cl.
CPC .......... *F02D 41/401* (2013.01); *F02D 37/02* (2013.01); *F02D 41/26* (2013.01);
(Continued)

(58) Field of Classification Search
CPC ........ F02D 41/40; F02D 41/401; F02D 41/30; F02D 41/3023; F02D 41/402;
(Continued)

(56) References Cited

U.S. PATENT DOCUMENTS 4,621,599 A    11/1986   Igashira et al.
6,659,073 B1    12/2003   Franke et al.
(Continued)

FOREIGN PATENT DOCUMENTS

JP    2002-276442 A    9/2002
JP    2003-254105 A    9/2003
(Continued)

*Primary Examiner* — Hieu T Vo
(74) *Attorney, Agent, or Firm* — Andrews Kurth Kenyon LLP

(57) ABSTRACT

An object is to achieve stable diesel combustion and improvement in the thermal efficiency of the diesel combustion in an internal combustion engine using a fuel having a relatively high self-ignition temperature. A control apparatus for an internal combustion engine includes a fuel injection valve capable of injecting fuel into a combustion chamber and an ignition device whose position relative to the fuel injection valve is set in such a way that it can ignite fuel spray directly. The apparatus performs pre-injection at a predetermined pre-injection time during the compression stroke and main injection at a predetermined injection start time after pre-spray formed by the pre-injection is ignited by the ignition device, thereby causing self-ignition to occur and causing at least a portion of the main-injected fuel to burn by diffusion combustion. When the quantity of the pre-injected fuel is increased, the pre-injection time is advanced responsive to the increase in the quantity of the pre-injected fuel.

6 Claims, 11 Drawing Sheets

(51) Int. Cl.
    F02D 37/02     (2006.01)
    F02D 41/26     (2006.01)
    F02P 5/15      (2006.01)
    F02P 15/00     (2006.01)

(52) U.S. Cl.
    CPC ..... *F02D 41/3017* (2013.01); *F02D 41/3023* (2013.01); *F02D 41/402* (2013.01); *F02P 5/15* (2013.01); *F02P 15/006* (2013.01); *Y02T 10/44* (2013.01)

(58) Field of Classification Search
    CPC . F02D 41/26; F02D 37/02; F02P 15/00; F02P 15/006; F02P 5/15
    See application file for complete search history.

(56) References Cited

U.S. PATENT DOCUMENTS

| 8,924,136 B2* | 12/2014 | Nakamoto | F02D 41/009 123/179.4 |
| 9,234,478 B2* | 1/2016 | Morinaga | F02D 13/0207 |
| 2011/0060514 A1 | 3/2011 | Nada | |

FOREIGN PATENT DOCUMENTS

| JP | 2007-064187 A | 3/2007 |
| JP | 2009-275654 A | 11/2009 |
| JP | 2013/136992 A | 7/2013 |
| WO | 2010/041308 A1 | 4/2010 |
| WO | 2011/061851 A1 | 5/2011 |

* cited by examiner

[Fig. 1]
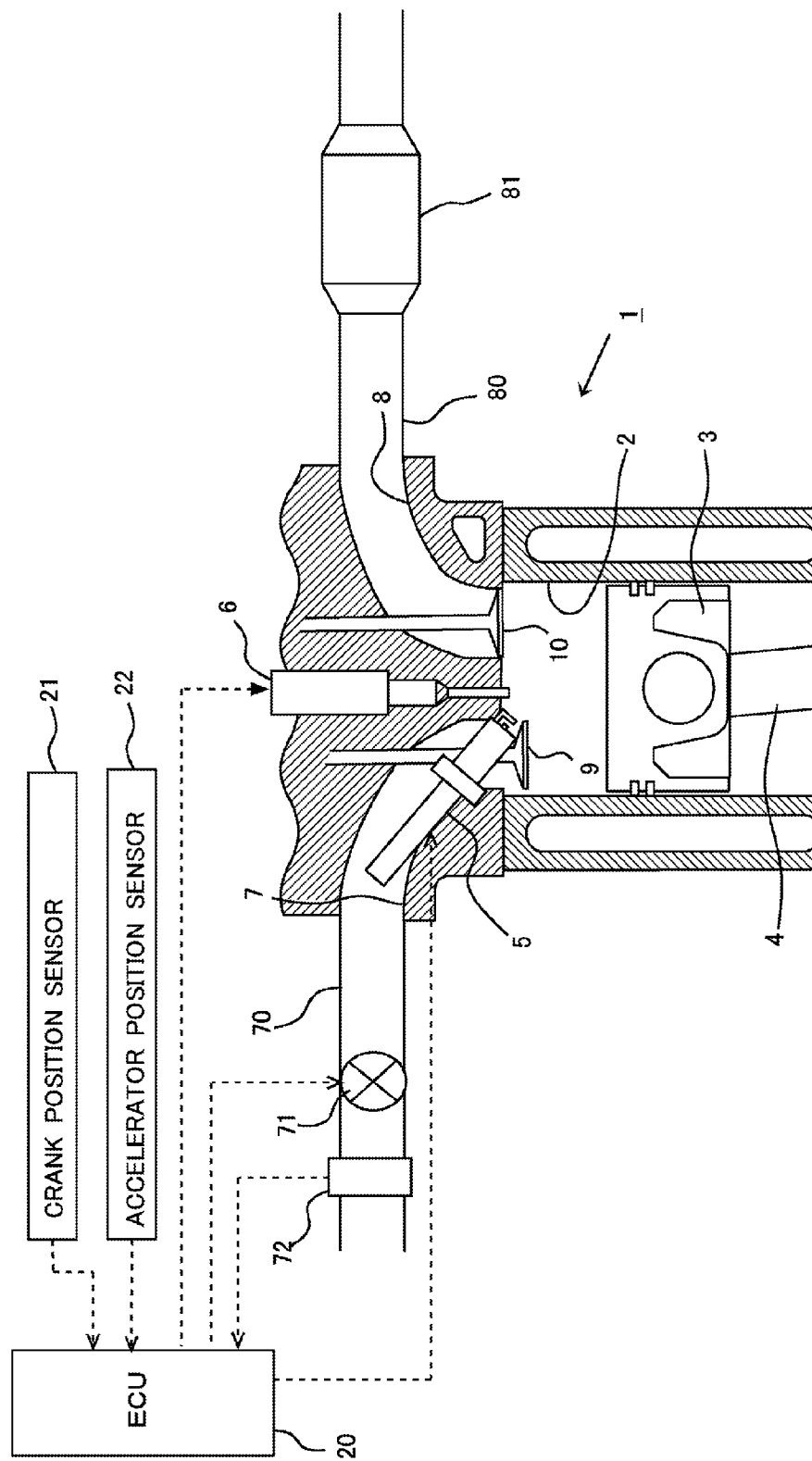

[Fig. 2]
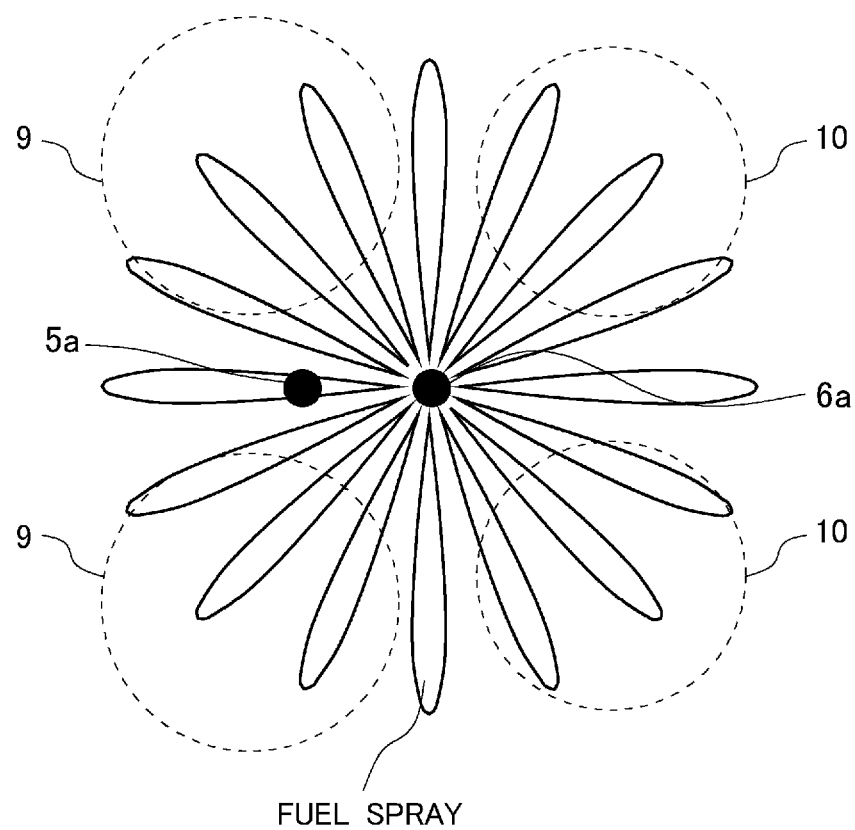
FUEL SPRAY

[Fig. 3]
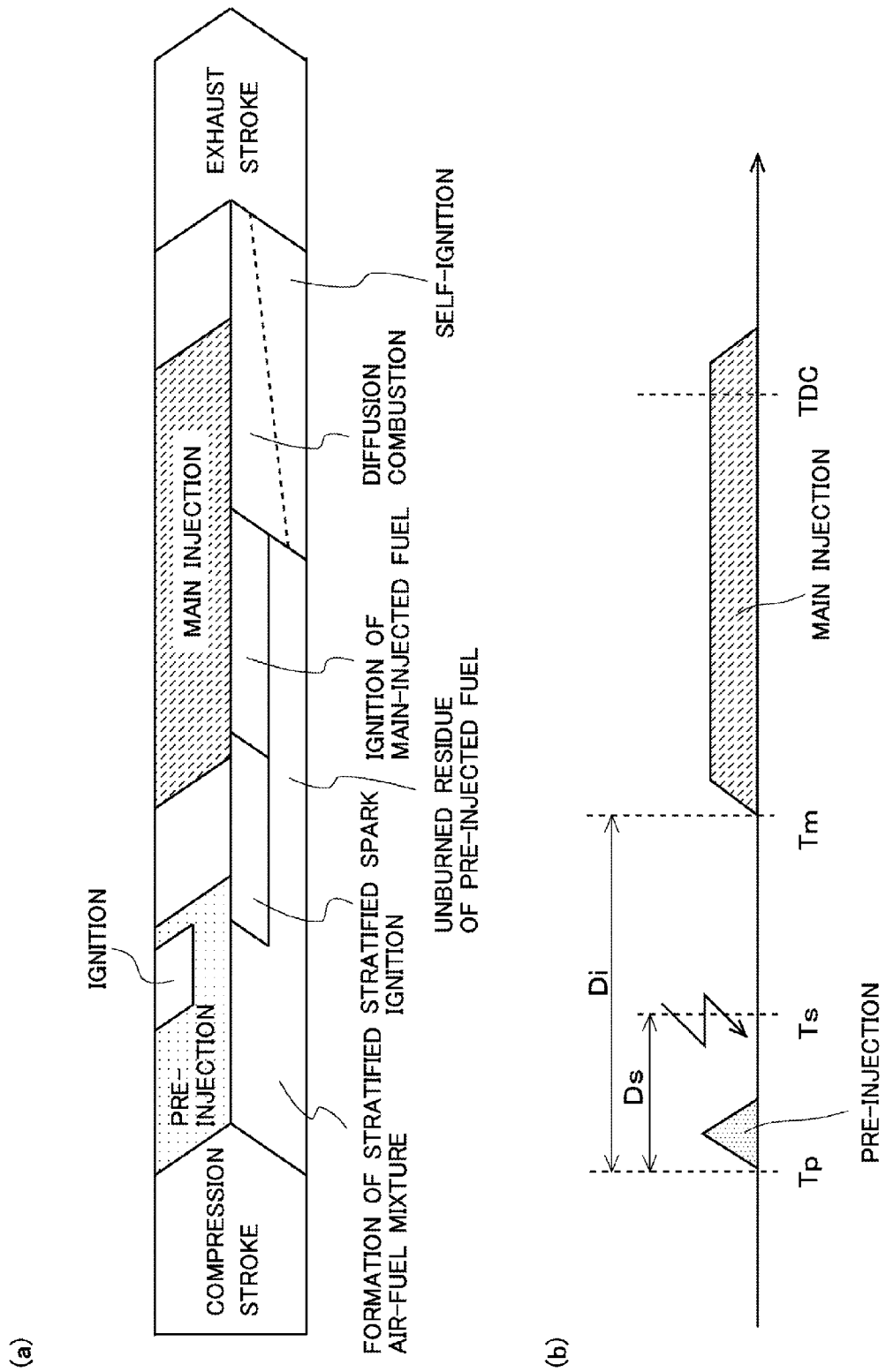

[Fig. 4]
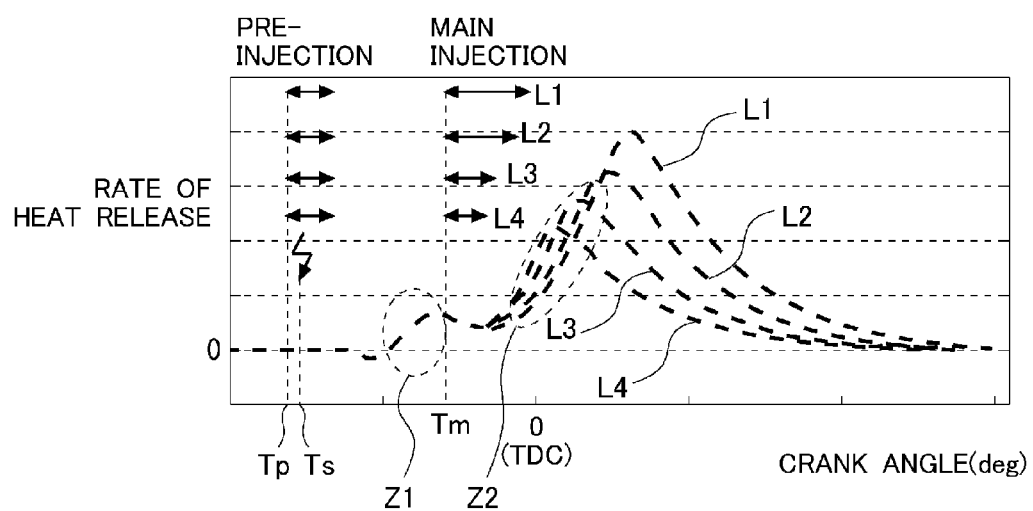
[Fig. 5]
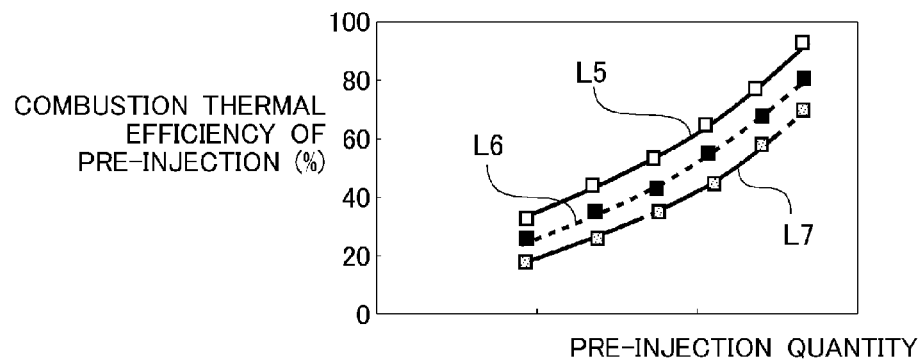

[Fig. 6]
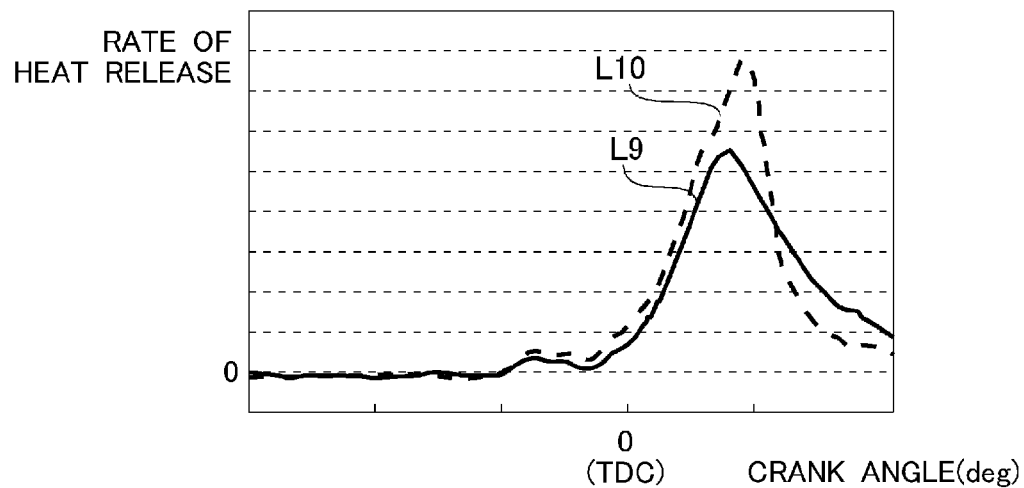
[Fig. 7]
(a)
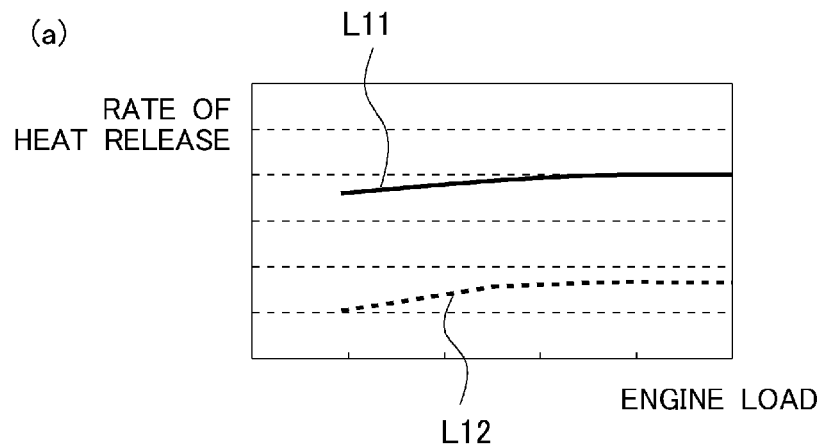
(b)
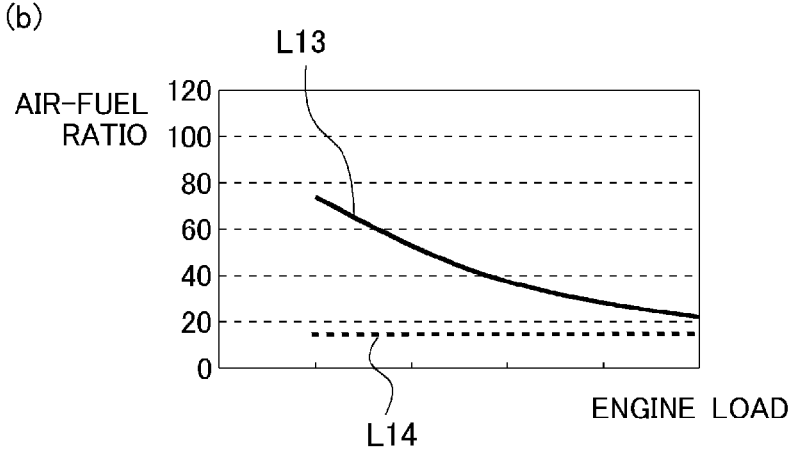

[Fig. 8]
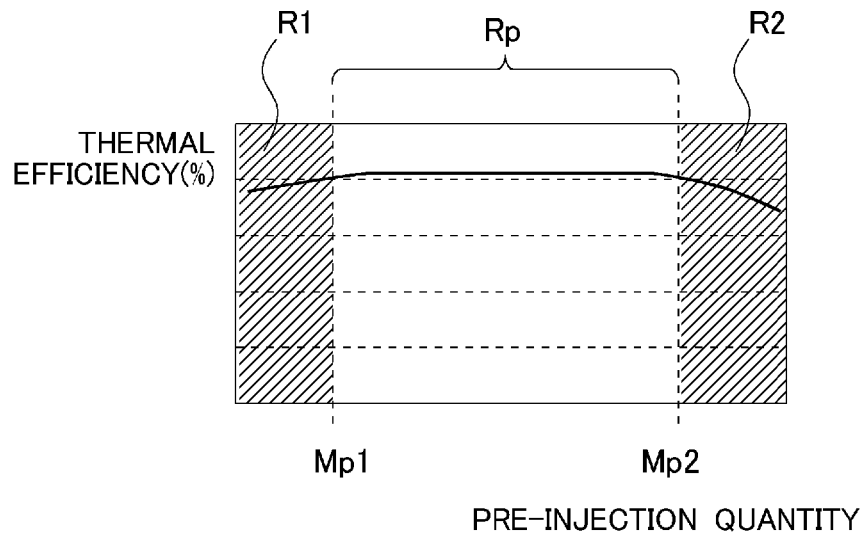
[Fig. 9]
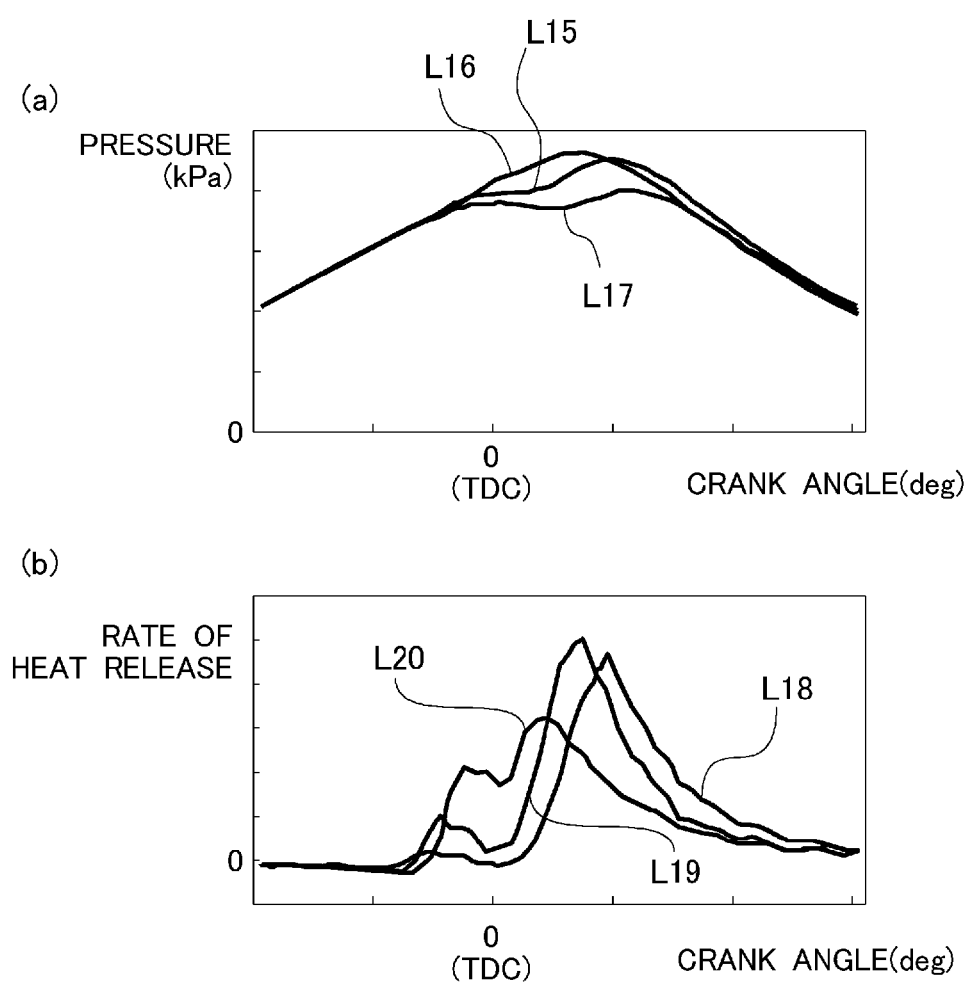

[Fig. 10]
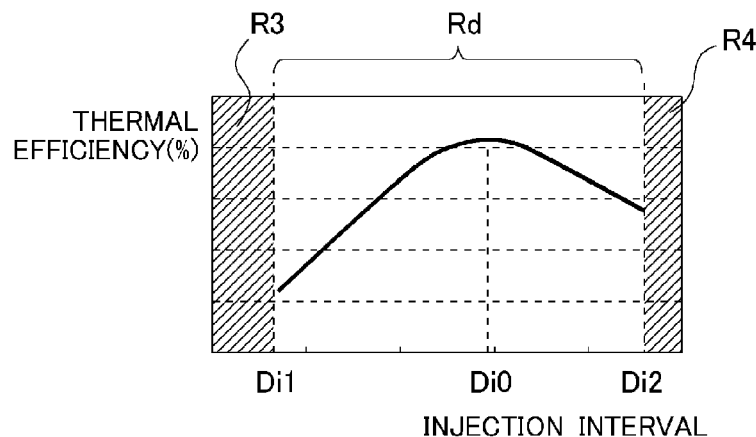
[Fig. 11]
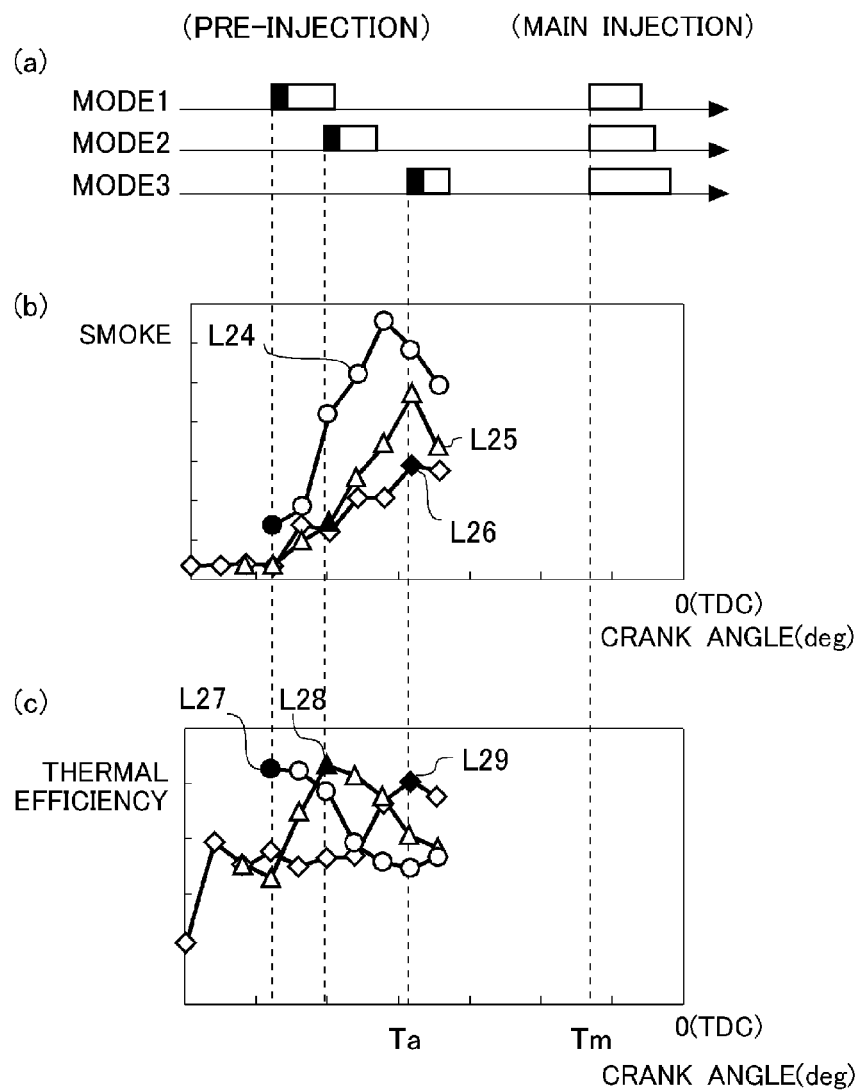

[Fig. 12]
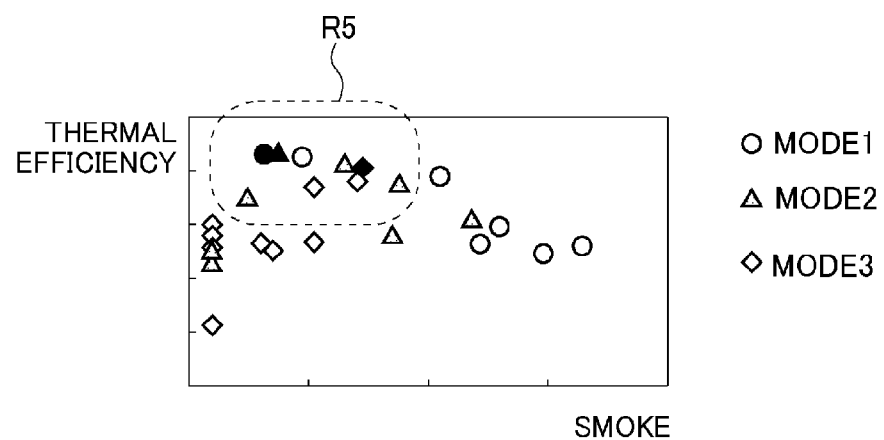

[Fig. 13]
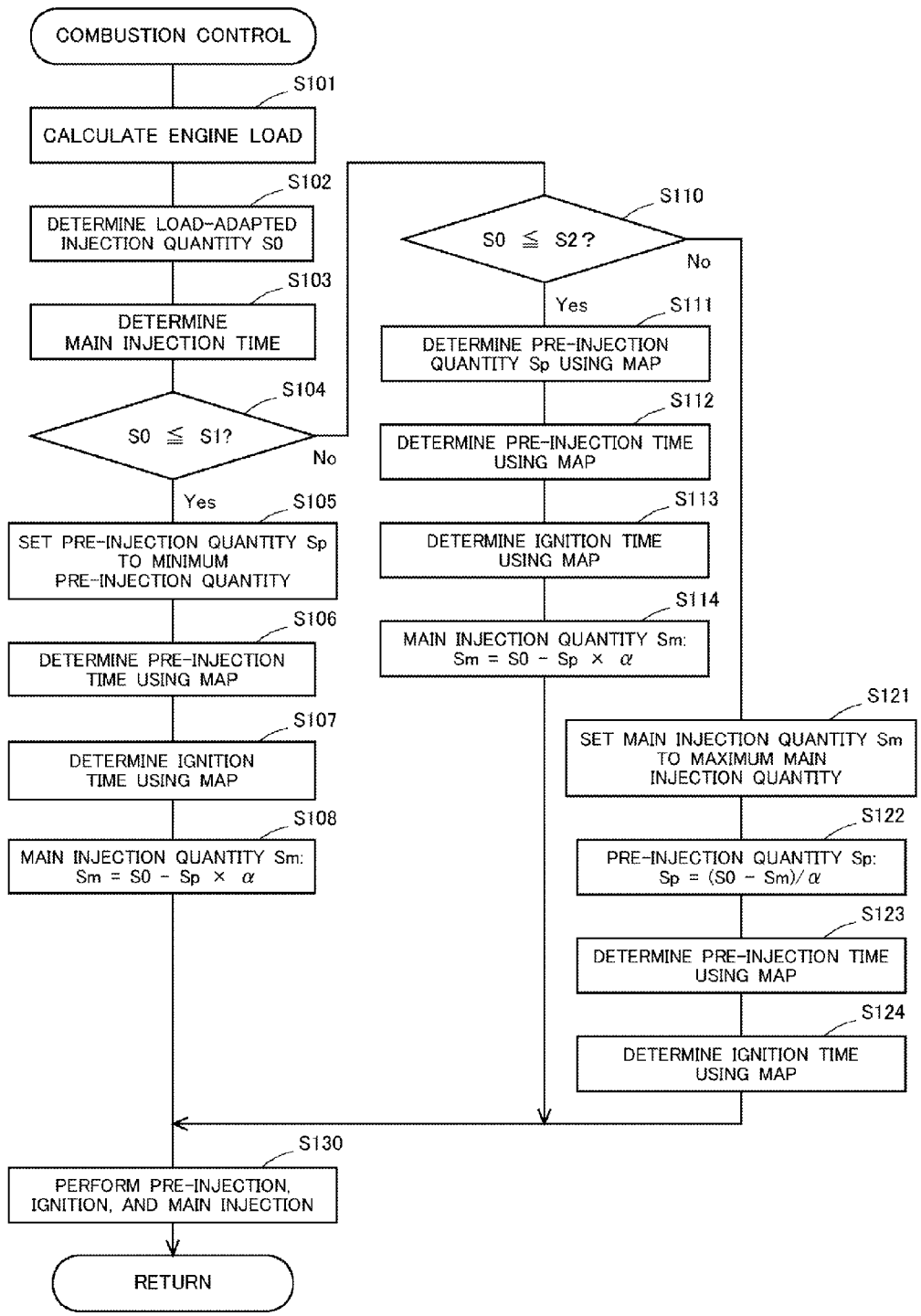

[Fig. 14]
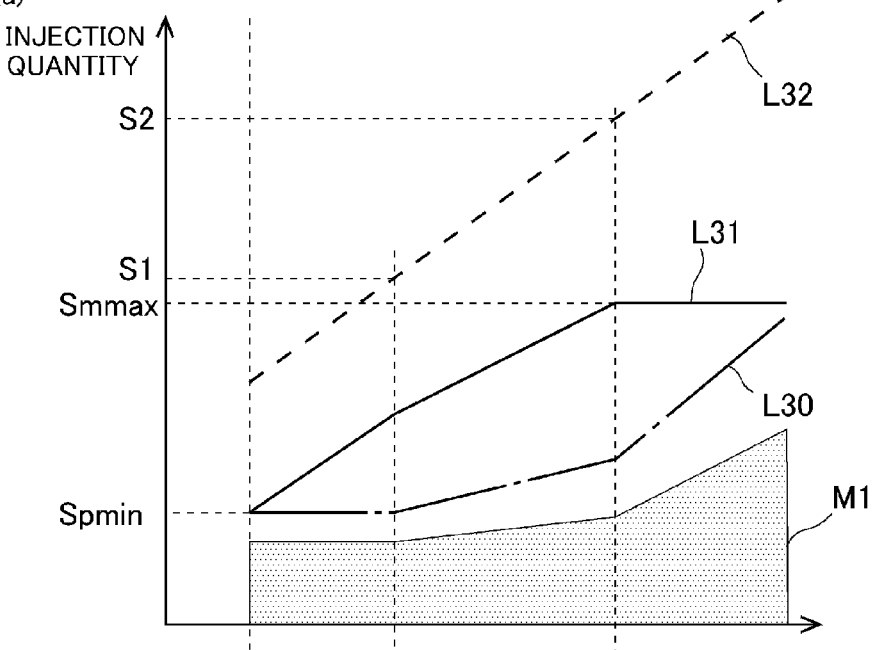
(a)
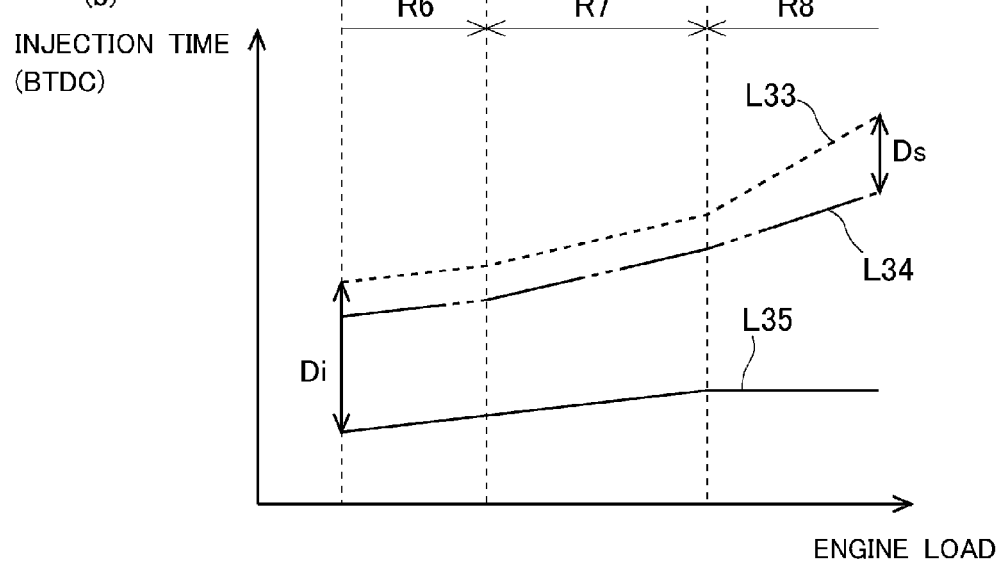
(b)

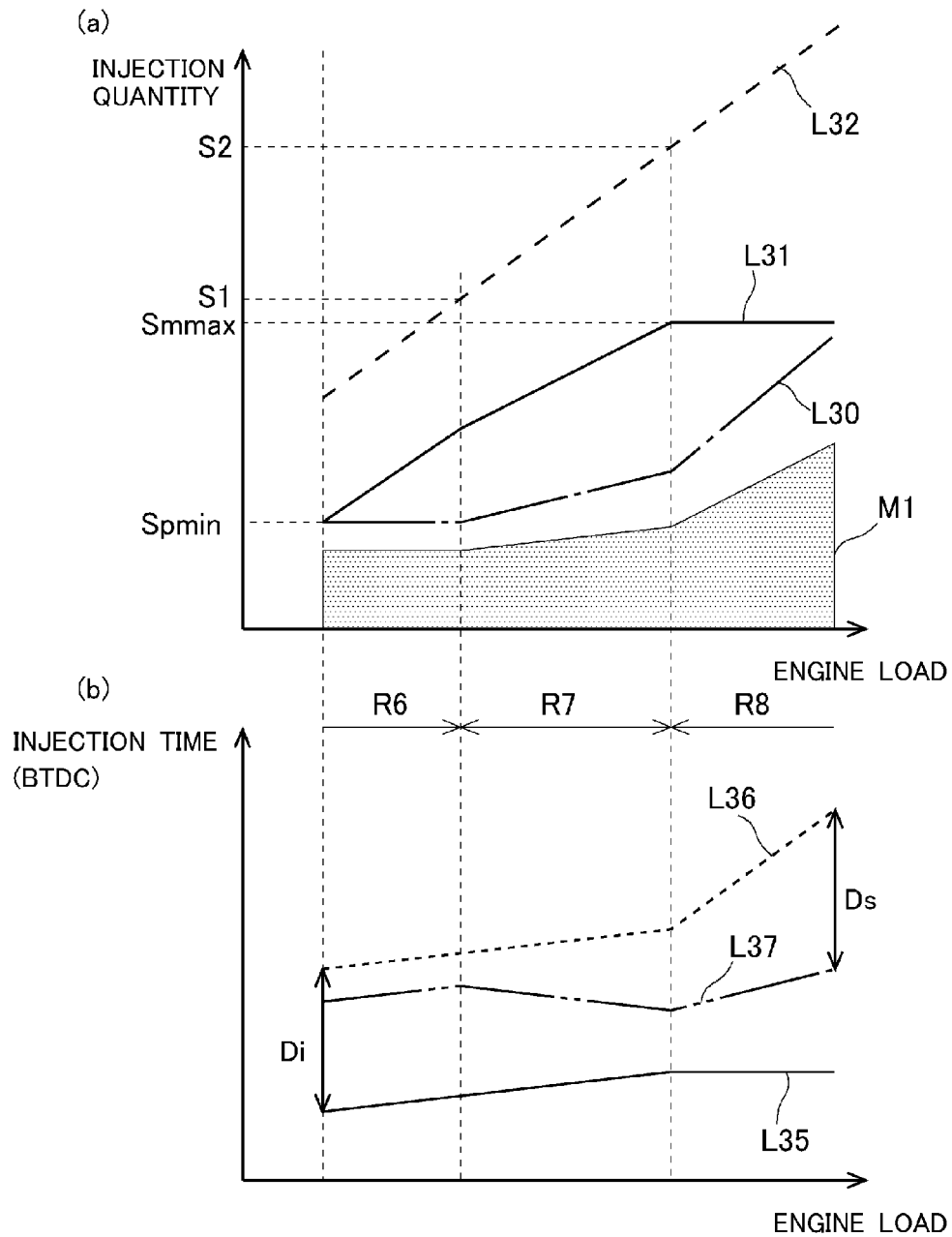

CONTROL APPARATUS FOR INTERNAL COMBUSTION ENGINE

CROSS-REFERENCE TO RELATED APPLICATIONS

This is a national phase application based on the PCT International Patent Application No. PCT/JP2015/000177 filed Jan. 16, 2015, claiming priority to Japanese Patent Application No. 2014-009488 filed Jan. 22, 2014, the entire contents of both of which are incorporated herein by reference.

TECHNICAL FIELD

The present invention relates to a control apparatus for an internal combustion engine.

BACKGROUND ART

What is called diesel combustion, in which fuel is directly injected into compressed air in the combustion chamber, self-ignites, and is burned by diffusion combustion, is advantageous over spark-ignition combustion in its excellent thermal efficiency. Although fuel generally used in diesel combustion is light oil having a relatively low self-ignition temperature, PTL 1, for example, discloses a technology in which natural gas having a relatively high self-ignition temperature is used as fuel in diesel combustion. Specifically, fuel injection is performed in a predetermined region in the combustion chamber in an early or middle stage of the compression stroke, and the air-fuel mixture formed in the aforementioned region is ignited at a time just before the top dead center of the compression stroke, to generate a high-temperature, high-pressure condition enabling self-ignition of natural gas in the combustion chamber. In addition, fuel is injected into the combustion chamber in a high-temperature, high-pressure condition for diffusion combustion after the top dead center of the compression stroke.

Attempts for igniting gasoline by self-ignition and burning it by diffusion combustion in spark-ignition gasoline engines have also been made. For example, in the technology disclosed in PTL 2, a first fuel injection is performed in a period in the first half of the compression stroke to form substantially homogeneous air-fuel ratio in the entirety of the combustion chamber, and the air-fuel mixture formed by this fuel injection is spark-ignited. Thereafter, a second fuel injection is performed to burn the fuel thus injected, so that the remaining fuel self-ignites with a rise in the temperature and pressure in the combustion chamber resulting from the burning. This technology can enlarge the operation range in which the occurrence of knocking can be prevented, whereby the advantage of diesel combustion can be enjoyed.

PTL 3 discloses technology pertaining to diesel combustion in a gasoline engine for the purpose of knocking suppression, as with the technology disclosed in PTL 2. Specifically, in a relatively high load operation range of a gasoline engine in which knocking is likely to occur, a first fuel injection is performed in a period before the top dead center of the compression stroke, and the fuel thus injected is burned by spark ignition, and fuel injection for diffusion combustion is performed in a period after the top dead center of the compression stroke in which the pressure in the combustion chamber is high due to the burning. In this technology, the timing of the first fuel injection is adjusted in accordance with the engine speed to achieve combustion favorable for suppression of knocking.

CITATION LIST

Patent Literature

PTL 1: Japanese Patent Application Laid-Open No. 2003-254105
PTL 2: Japanese Patent Application Laid-Open No. 2002-276442
PTL 3: Japanese Patent Application Laid-Open No. 2007-64187

SUMMARY OF INVENTION

Technical Problem

In order to cause diesel combustion in an internal combustion engine using fuel having a relatively high self-ignition temperature such as a gasoline engine, it is necessary that the temperature and pressure in the combustion chamber be high enough to allow injected fuel to self-ignite and to be burned by diffusion combustion at the time when the main injection that determines the power of the internal combustion engine is performed. In the case where a first injection is performed before the main injection immediately after the top dead center of the compression stroke and the fuel is spark-ignited to burn, as is the case with the above-described prior arts, the first injection as such causes combustion during the compression stroke. This is a cause of a decrease in the power of the internal combustion engine. Consequently, it is difficult to improve the thermal efficiency of the internal combustion engine. Furthermore, the aforementioned prior arts do not sufficiently describe improvement of thermal efficiency during diesel combustion in spark-ignition internal combustion engines.

The present invention has been made in view of the above-described problems, and its object is to achieve both stable diesel combustion and improvement in its thermal efficiency in an internal combustion engine using a fuel having a relatively high self-ignition temperature.

Solution to Problem

In the present invention, to solve the above-described problem, we developed a control apparatus that causes a predetermined way of combustion, in which pre-injection is performed before main injection that mainly determines the power of an internal combustion engine, the fuel injected by the pre-injection (which will be hereinafter referred to as the "pre-injected fuel") is spark-ignited, and thereafter at least fuel injected by the main injection (which will be hereinafter referred to as the "main-injected fuel") is burned by diesel combustion. Moreover, in the combustion control developed by us, when the quantity of the pre-injected fuel is increased in the above-described way of combustion, the pre-injection time is advanced. With the above features, it is possible to achieve both stable diesel combustion and improvement in the thermal efficiency in the internal combustion engine. It should be noted that the words "pre" and "main" in the context of the present invention qualify injections only in terms of their temporal priority and posteriority, and these words should not be construed in any limited sense other than the technical meaning described in the following.

Specifically, according to the present invention, there is provided a control apparatus for an internal combustion engine comprising a fuel injection valve capable of injecting fuel into a combustion chamber of an internal combustion engine, an ignition device whose position relative to the fuel injection valve is set in such a way that fuel spray injected through said fuel injection valve passes through an ignition-capable region and the ignition device can ignite the fuel spray directly, and control means that performs pre-injection through said fuel injection valve at a predetermined pre-injection time during the compression stroke and main injection at such a predetermined injection start time before the top dead center of the compression stroke that enables combustion to be started by flame generated by combustion of pre-injected fuel after pre-spray formed by the pre-injected fuel is ignited by said ignition device, thereby causing a predetermined way of combustion in which self-ignition occurs and at least a portion of the main-injected fuel is burned by diffusion combustion, wherein when the quantity of said pre-injected fuel is increased, the control means advances said pre-injection time responsive to the increase in the quantity of said pre-injected fuel.

The position of the ignition device relative to the fuel injection valve is set in such a way that the ignition device can directly ignite passing fuel spray which is fuel spray injected through the fuel injection valve and passing through the ignition-capable region. It is generally the case that air-fuel mixture is brought to the ignition-capable region of the ignition device by means of gas flow formed in the combustion chamber according to the target combustion form when the intake valve is opened or the shape of a cavity or the like located on top of the piston, so that the fuel spray is ignited. In such a generally employed mode of ignition, the injection time at which injection through the injection valve is to be performed is greatly dependent on the opening time of the intake valve and the position of the piston in the cylinder and other factors. In contrast to this, in the control apparatus for an internal combustion engine according to the present invention, since the relative position of the fuel injection valve and the ignition device is set relative to each other as described above, control of the fuel injection time and the ignition time has very high flexibility, enabling control of fuel injections by the combustion control means, which will be described later. Preferably, the ignition device is adapted to be capable of directly igniting the passing fuel spray injected through the fuel injection valve at desired time without regard to the opening time of the intake valve and the piston position of the internal combustion engine.

In the predetermined way of combustion caused by the combustion control means, pre-injection at the predetermined pre-injection time during the compression stroke and ignition of the pre-spray by the ignition device are firstly performed. Thereafter, the main injection is performed at the predetermined injection start time before the top dead center of the compression stroke, so that self-ignition diffusion combustion occurs. The main injection is fuel injection that is performed in such a way that combustion is started by flame generated by the pre-injected fuel. Therefore, correlation of the pre-injection and the main injection is controlled in such a way that a portion of the main-injected fuel is ignited by flame generated by ignition-combustion of the pre-injected fuel and thereafter self-ignition diffusion combustion occurs. Thus, the predetermined pre-injection time at which the pre-injection is performed is not simply an injection time during the compression stroke, but it is set taking into consideration its correlation with the main injection so as to enable self-ignition diffusion combustion after the main injection.

We endeavored to find that the predetermined way of combustion according to the present invention can accomplish stability of combustion and improvement in the thermal efficiency of the internal combustion engine that cannot be achieved by prior arts. It is considered that one of the causes of the above effects is that the above-described correlation of the pre-injection and the main injection creates a high-temperature, high-pressure condition at the time of injection of the main-injected fuel by combustion of the pre-injected fuel in the combustion chamber and that a portion of the pre-injected fuel self-ignites together with the main-injected fuel and is burned by diffusion combustion to contribute to the engine power efficiently. The cause of the stability of combustion and improvement in the thermal efficiency of the internal combustion engine accomplished by the present invention is not necessarily limited to that described above, and all the control apparatuses based on the above-described technical idea are encompassed in the scope of the present invention, even if the above-described effects are accomplished by other causes.

In the above-described predetermined way of combustion, when the quantity of the pre-injected fuel is increased due to increases in the engine load of the internal combustion engine or other reasons, the combustion control means advances the pre-injection time in accordance with the increase in the quantity of the pre-injected fuel. If the quantity of the pre-injected fuel is increased with the pre-injection time being fixed, the quantity of fuel burned by ignition by the ignition plug after the pre-injection would increase. In view of this, when the quantity of the pre-injected fuel is increased, the pre-injection time is advanced. It is considered that this leads to an increase in the quantity of fuel remaining in the combustion chamber even at the time of the main injection. Since the pre-injected fuel remaining in the combustion chamber even at the time of main injection is subjected to self-ignition diffusion combustion together with the main-injected fuel, it contributes to the engine power. Moreover, if the quantity of the pre-injected fuel is increased with the pre-injection time being fixed, a situation in which it is difficult to achieve diffusion combustion efficiently taking in oxygen arises locally after the min injection, and smoke is likely to be generated. If the pre-injection time is advanced in accordance with the increase in the quantity of the pre-injected fuel, the pre-injection is performed in a state in which the pressure in the combustion chamber is lower than that in the case where the pre-injection time is not advanced. Thus, air in the combustion chamber is efficiently used, and generation of smoke can be prevented or reduced. In consequence, the above-described predetermined way of combustion can be realized with the above-described stability of combustion and improvement in the thermal efficiency of the internal combustion engine over a wider operation range of the internal combustion engine.

In the above-described control apparatus for an internal combustion engine, responsive to the increase in the quantity of said pre-injected fuel, said combustion control means may advance said pre-injection time and increase an ignition interval between said pre-injection time and the time of ignition by said ignition device. The correlation between the pre-injection and the main injection can also be adjusted by adjusted the ignition interval. In particular, increasing the ignition interval leads to a change in the state of flow of the pre-injected fuel in the combustion chamber at the time of ignition. This, in turn, leads to a decrease in the proportion of the pre-injected fuel that is burned by ignition by the ignition device and an increase in the proportion of the pre-injected fuel burned with the main-injected fuel, which are considered to change the correlation of the pre-injection and the main injection. Consequently, reduction of smoke and improvement in the thermal efficiency of the internal combustion engine are achieved by the advancement of the pre-injection time.

In the control apparatus for an internal combustion engine as described above, when the engine load of said internal combustion engine is equal to or higher than a predetermined first load, said combustion control means may increase the quantity of said pre-injected fuel in accordance with the increase in the engine load and advance said pre-injection time in accordance with the increase in the quantity of said pre-injected fuel. The predetermined first load mentioned above is an engine load at which the quantity of injected fuel burned in combustion in one cycle in the internal combustion engine is relatively large. In this case, as the engine load increases, a portion of the pre-injected fuel and the main-injected fuel exists in the combustion chamber after the main injection in a state in which available air is locally insufficient. In this state, smoke is likely to be generated. As a countermeasure to this, in the present invention, the pre-injection quantity is increased and its injection time is advanced in response to the increase in the engine load as described above. Thus, adaptation to the increased engine load and reduction of smoke can both be achieved. In the present invention, since the pre-injection and the main injection are correlated with each other, when the quantity of the pre-injected fuel is increased, a portion thereof is burned together with the main-injected fuel. Therefore, the thermal efficiency of the internal combustion engine can be kept at satisfactory levels.

In the above-described control apparatus for an internal combustion engine, when the engine load of said internal combustion engine is equal to or higher than a predetermined second load higher than first load, said combustion control means may increase the quantity of said pre-injected fuel in accordance with the increase in the engine load while keeping the quantity of said main-injected fuel at a predetermined upper limit quantity and advance said pre-injection time in accordance with the increase in the quantity of said pre-injected fuel. The predetermined second load mentioned above is an engine load at which if the quantity of the main-injected fuel is increased with a further increase in the quantity of injected fuel burned in combustion in one cycle in the internal combustion engine, there arises a possibility that smoke may be generated due to the effect of evaporation latent heat of the main-injected fuel. Therefore, when the engine load reaches or exceeds the higher second load, the quantity of the main-injected fuel is kept at the predetermined upper limit quantity so as not to exceed the upper limit quantity, thereby reducing smoke. Increases in the quantity of fuel in response to increases in the engine load are achieved by increasing the quantity of the pre-injected fuel and advancing the pre-injection time. By performing the above-described control for the predetermined way of combustion, the predetermined way of combustion can be applied in a wider high load range of the internal combustion engine.

In the above-described control apparatus for an internal combustion engine, when the engine load of said internal combustion engine is in a predetermined low load range, said combustion control means may not increase the quantity of said pre-injection quantity in accordance with the engine load of said internal combustion engine but keep the injection quantity of said pre-injected fuel at a minimum pre-injection quantity, which is the smallest injection quantity in said pre-injection. When the engine load of the internal combustion engine is in the predetermined low load range, the fuel injection quantity in one cycle is relatively small. In such cases, if the quantity of the pre-injected fuel is made unreasonably large, the quantity of the main-injected fuel decreases. Then, even if the above-described correlation between the pre-injection and the main-injection is established, the decrease in the quantity of the main-injected fuel can lead to a significant decrease in the thermal efficiency of the internal combustion engine. On the other hand, if the quantity of the pre-injected fuel is made unreasonably small, it is not possible to generate flame for igniting the main-injected fuel appropriately or to establish a high-temperature, high-pressure condition in the combustion chamber for diffusion combustion appropriately, possibly leading to unstable combustion. Therefore, the aforementioned minimum pre-injection quantity is set as a quantity at which the pre-injected fuel quantity is kept in the low load range to achieve a satisfactory thermal efficiency of the internal combustion engine and stability of combustion in the low load range.

Advantageous Effects of Invention

According to the present invention, it is possible to achieve both stable diesel combustion and improvement in its thermal efficiency in an internal combustion engine using a fuel having a relatively high self-ignition temperature.

BRIEF DESCRIPTION OF DRAWINGS

FIG. 1 is a diagram showing the general configuration of the air-intake and exhaust systems of an internal combustion engine to which an embodiment of the present invention is applied.

FIG. 2 is a diagram showing a mode of ignition by an ignition device with which the internal combustion engine shown in FIG. 1 is equipped.

FIG. 3 is a diagram illustrating combustion control performed by a control apparatus for an internal combustion engine according to the present invention (which will be hereinafter referred to as the "combustion control according to the present invention").

FIG. 4 is a first graph showing the change in the rate of heat release in the combustion chamber with the combustion control according to the present invention.

FIG. 5 is a graph showing relationship between the pre-injection quantity and the combustion efficiency of the pre-injected fuel in a case where pre-injection in the combustion control according to the present invention is performed in the internal combustion engine shown in FIG. 1, where measurement is performed for different pre-injection times.

FIG. 6 is a second graph showing the change in the rate of heat release in the combustion chamber with the combustion control according to the present invention.

FIG. 7 includes a graph showing an example of relationship between the engine load and the thermal efficiency and a graph showing an example of relationship between the engine load and the air-fuel ratio in the combustion chamber in a case where the combustion control according to the present invention is applied to the internal combustion engine shown in FIG. 1.

FIG. 8 is a graph showing relationship between the pre-injection quantity and the thermal efficiency in the internal combustion engine in the low load state in the combustion control according to the present invention.

FIG. 9 includes a graph showing the change of the pressure in the cylinder and a graph showing the change of the rate of heat release for different pre-injection quantities in the combustion control according to the present invention.

FIG. 10 is a graph showing the change of the thermal efficiency with the change of injection interval between pre-injection and main injection in the combustion control according to the present invention.

FIG. 11 includes a graph showing the change of the amount of generated smoke and a graph showing the change of the thermal efficiency with increase in the quantity of pre-injected fuel and advancement of the pre-injection time in a case where the combustion control according to the present invention is applied to the internal combustion engine shown in FIG. 1.

FIG. 12 is a graph showing relationship between the amount of generated smoke and the thermal efficiency measured for different pre-injection quantities in a case where the combustion control according to the present invention is applied to the internal combustion engine shown in FIG. 1.

FIG. 13 is a flow chart of the combustion control according to the present invention applied to the internal combustion engine shown in FIG. 1.

FIG. 14 is a first graph showing control maps for pre-injection, ignition of pre-injected fuel, and main injection which are used for the internal combustion engine shown in FIG. 1.

FIG. 15 is a second graph showing control maps for pre-injection, ignition of pre-injected fuel, and main injection which are used for the internal combustion engine shown in FIG. 1.

DESCRIPTION OF EMBODIMENTS

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

Example 1

FIG. 1 is a diagram showing the general configuration of the air-intake and exhaust systems of an internal combustion engine to which the present invention is applied. The internal combustion engine 1 shown in FIG. 1 is a four-stroke-cycle, spark-ignition internal combustion engine (gasoline engine) having a plurality of cylinders. FIG. 1 shows only one of the plurality of cylinders.

In each cylinder 2 of the internal combustion engine 1, a piston 3 is provided in a slidable manner. The piston 3 is linked with an output shaft (crankshaft), which is not shown in the drawings, by a connecting rod 4. The interior of the cylinder 2 is in communication with intake ports 7 and exhaust ports 8. An end of the intake port 7 opening into the cylinder 2 is opened/closed by an intake valve 9. An end of the exhaust port 8 opening into the cylinder 2 is opened/closed by an exhaust valve 10. The intake valve 9 and the exhaust valve 10 are driven to be opened/closed respectively by an intake cam and an exhaust cam not shown in the drawings.

Furthermore, each cylinder 2 is provided with a fuel injection valve 6 for injecting fuel into the cylinder. The fuel injection valve 6 is arranged at the center on top of the combustion chamber formed in the cylinder 2. Moreover, an ignition plug 5 that can ignite fuel injected through the fuel injection valve 6 is provided in the cylinder head of the internal combustion engine 1. Specifically, the fuel injection valve 6 has an injection port 6a with which fuel can be injected nearly radially in 16 (sixteen) directions as shown in FIG. 2. The position of the ignition plug 5 relative to the fuel injection valve 6, in particular the position of a region 5a between electrodes, in which the ignition plug 5 is capable of igniting, relative to the fuel injection valve 6 is arranged in such a way that at least one of the fuel sprays or fuel jets injected from the injection port 6a passes through the region 5a and that the fuel spray thus passing through it can be directly ignited by inter-electrode current flowing in the region 5a. The ignition plug 5 is located between the two intake valves 9 so that it does not interfere with the operations of the intake valves 9 and the exhaust valves 10.

The ignition plug 5 and the fuel injection valve 6 configured as above can carry out spray guide combustion. In other words, the ignition plug 5, which is arranged in such a way as to be capable of directly igniting fuel injected through the fuel injection valve 6, and the fuel injection valve 6 enables ignition of injected fuel passing through the region 5a at any desired time without regard to the opening timing of the intake valves 9 of the internal combustion engine 1 or the position of the piston 3. On the other hand, in the case of air guide combustion in which fuel injected through the fuel injection valve is carried to the neighborhood of the ignition plug by means of air flowing into the combustion chamber with opening of the intake valve to ignite it and in the case of wall guide combustion in which injected fuel is carried to the neighborhood of the ignition plug utilizing the shape of a cavity provided on top of the piston to ignite it, it is difficult to perform fuel injection and ignition unless a predetermined time for opening the intake valve is reached and a predetermined piston position is established. The spray guide combustion according to this example allows very flexible fuel injection and ignition timing control as compared to the air guide combustion and the wall guide combustion.

Returning back to FIG. 1, the intake port 7 is in communication with an intake passage 70. The intake passage 70 is provided with a throttle vale 71. An air flow meter 72 is provided in the intake passage 70 upstream of the throttle valve 71. On the other hand, the exhaust port 8 is in communication with an exhaust passage 80. An exhaust gas purification catalyst 81 for purifying the exhaust gas discharged from the internal combustion engine 1 is provided in the exhaust passage 80. As will be described later, the exhaust gas discharged from the internal combustion engine 1 has an air-fuel ratio leaner than the stoichiometry, and a selective catalytic reduction NOx catalyst capable of removing NOx in the exhaust gas having such a lean air-fuel ratio and a filter capable of trapping particulate matter (PM) in the exhaust gas may be employed as the exhaust gas purification catalyst 81.

Moreover, an electronic control unit (ECU) 20 is annexed to the internal combustion engine 1. The ECU 20 is a unit that controls the operation state of the internal combustion engine 1 and the exhaust gas purification apparatus etc. The ECU 20 is electrically connected with the aforementioned air flow meter 72, a crank position sensor 21, and an accelerator position sensor 22, and measurement values of the sensors are supplied to the ECU 20. Thus, the ECU 20 can recognize the operation state of the internal combustion engine 1, such as the intake air quantity based on the measurement value of the air flow meter 72, the engine speed based on the measurement value of the crank position sensor 21, and the engine load based on the measurement value of the accelerator position sensor 22. The ECU 20 is also electrically connected with the fuel injection valve 6, the ignition plug 5, and the throttle valve 71 etc. These components are controlled by the ECU 20.

<Combustion Control>

Combustion control performed in the internal combustion engine 1 having the above-described configuration will now be described with reference to FIG. 3. FIG. 3(a) schematically shows procedure of fuel injection and ignition in combustion control performed in the internal combustion engine 1 in time sequence from left to right of the diagram (see upper row of FIG. 3(a)) and phenomena relating to combustion occurring in succession in the combustion chamber as results of the fuel injection and ignition (see the lower row of FIG. 3(a)). FIG. 3(b) shows relationship of pre-injection and main injection, which are included in the fuel injections shown in FIG. 3(a), and ignition in time line. The mode shown in FIG. 3 is given only as a schematic illustration of the combustion control according to the present invention, and the present invention should not be considered to be limited to this mode.

In the combustion control according to the present invention, pre-injection and main injection are performed in one cycle. The pre-injection is fuel injection performed through the fuel injection valve 6 at a predetermined time during the compression stroke. The main injection is fuel injection performed also through the fuel injection valve 6 at a time after the pre-injection and before the top dead center (TDC) of the compression stroke. As shown in FIG. 3(b), the injection start time of the pre-injection (which will be simply referred to as the "pre-injection time" hereinafter) is denoted by Tp, and the injection start time of the main injection (which will be simply referred to as the "main injection time" hereinafter) is denoted by Tm. The interval between the pre-injection and the main injection (Tm-Tp) is defined as the injection interval Di. Combustion with the pre-injection is performed as the above-described spray guide combustion, and the fuel injected by the pre-injection (which will be hereinafter referred to as "pre-injected fuel") is ignited using the ignition plug 5. The time of this ignition is denoted by Ts as shown in FIG. 3(b), and the interval from the start of the pre-injection to the time of ignition (Ts-Tp) is defined as the ignition interval Ds.

In the following, the procedure of the combustion control according to the present invention will be described.

(1) Pre-Injection

In one cycle in basic combustion control, the pre-injection is firstly performed at a predetermined time during the compression stroke. The pre-injection time Tp is determined in relation to the later-described main injection. After the pre-injection is started, the fuel injected through the fuel injection valve 6 passes through the ignition-capable region 5a of the ignition plug 5 in the combustion chamber as shown in FIG. 2. Immediately after the start of the pre-injection, the pre-injected fuel is not diffused widely in the combustion chamber but travels in the combustion chamber by the penetrating force of injection while involving the air around at the leading end of the spay jet. Consequently, the pre-injected fuel creates air-fuel mixture stratified in the combustion chamber.

(2) Ignition of Pre-Injected Fuel

The pre-injected fuel thus stratified is ignited by the ignition plug 5 at time Ts after the ignition interval Ds from the start of the pre-injection. As described above, since the pre-injected fuel is stratified, the local air-fuel ratio is at a level allowing combustion by this ignition. Besides the effect of compression by the piston 3, the progress of combustion of the pre-injected fuel thus ignited causes a further temperature rise in the combustion chamber. On the other hand, in the present invention, a portion of the pre-injected fuel is not burned in the combustion caused by the ignition by the ignition plug 5 but remains in the combustion chamber as "unburned residual fuel". Since the unburned residual fuel has been exposed to a high-temperature atmosphere resulting from the combustion of a portion of the pre-injected fuel in the combustion chamber, it is expected that at least a portion of the unburned residual fuel has been reformed to be improved in its combustibility by low temperature oxidation under a condition that does not cause it to be burned. It should be noted, however, that in the present invention the unburned residual fuel refers to a portion of pre-injected fuel that remains without having been burned in the combustion caused by the ignition by the ignition plug 5, and it is not essential for the unburned residual fuel to be in a condition showing specific properties.

(3) Main Injection

The main injection through the fuel injection valve 6 is performed at time Tm after the injection interval Di from the start of the pre-injection, in other words, at time Tm before the top dead center of the compression stroke after the lapse of time equal to Di-Ds from the time of ignition Ts by the ignition plug 5. In this internal combustion engine 1, the main-injected fuel is burned by diffusion combustion to contribute to the most part of the engine power as will be described later. The injection start time Tm of the main injection is set to a time at which the engine power attained with a quantity of main fuel injection determined by the engine load and other factors is nearly maximized (which will be hereinafter referred to as "proper injection time"). A portion of the fuel injected by the main injection started at time Tm is ignited by flame generated by the combustion of the pre-injected fuel and burned, whereby the temperature in the combustion chamber is further raised. Moreover, the unburned residue of the pre-injected fuel and the main-injected fuel self-ignite with the rise in the temperature and are subjected to diffusion combustion. As described above, in cases where the combustibility of the unburned residual fuel has been enhanced, the combustion of the main-injected fuel is expected to progress more smoothly.

As described above, in the combustion control according to the present invention, the above-described series of combustions occur with intervening ignition by the ignition plug 5 in the period between the pre-injection and the main injection. In the pre-combustion, the injection time of the pre-injection or the injection interval Di is set in such a way as to enable the above-described series of combustion with the main injection performed at the proper injection time. In this specification, the correlation between the pre-injection and the main injection that causes combustion of the main-injected fuel to be started by flame of the pre-injected fuel and causes self-ignition and diffusion combustion of the unburned residue of the pre-injected fuel and the main-injected fuel to occur will be hereinafter referred to as the "pre-main correlation". Thus, in the combustion control according to the present invention, the main injection that has the pre-main correlation with the pre-injection and the ignition of the pre-injected fuel is performed.

FIG. 4 shows the changes of rate of heat release in the combustion chamber in a case where combustion control according to the present invention is performed. FIG. 4 shows the changes of the rate of heat release corresponding to four different control modes (L1 to L4) in a case where the engine speed of the internal combustion engine 1 is 2000 rpm. In these control modes, while the pre-injection time Tp, the pre-injection quantity, the main injection time Tm, and the ignition time Ts are the same, the main injection quantity is varied among the control modes (specifically, the main injection quantity is varied like L1>L2>L3>L4). Thus, the pre-main correlation is the same among the control modes, and FIG. 4 shows variation of the change of the rate of heat release with variation in the main injection quantity under the condition that the pre-main correlation is the same.

In FIG. 4, the rate of heat release shows a first peak in a portion Z1 encircled by a broken line. This peak results from heat generated by the ignition and combustion of the pre-injected fuel. In the period of the portion Z1, the main injection has not been performed yet, and flame generated by the pre-injected fuel and the unburned residual fuel or the unburned portion of the pre-injected fuel are present in the combustion chamber. Now, the unburned residue of the pre-injected fuel will be described with reference to FIG. 5. FIG. 5 shows correlation of the pre-injection quantity and the combustion efficiency of pre-injected fuel for three combustion conditions (L5 to L7), where the pre-injection is assumed to be the pre-injection performed in the combustion control shown in FIG. 4. Specifically, the pre-injection time Tp and the ignition time Ts, which are the combustion conditions, are advanced in the order of L5, L6, and L7, while the ignition interval Ds or the interval between time Tp and time Ts is fixed. FIG. 5 shows the above-described correlation in cases where only the pre-injection and ignition are performed but the main injection is not performed.

The combustion efficiency of pre-injected fuel and the unburned residue rate of the pre-injected fuel are in a relationship represented by the following equation 1, and the higher the combustion efficiency is, the lower the unburned residue rate is.

[Math.1]

(unburned residue rate of pre-injected fuel)=1−(combustion efficiency of pre-injected fuel)  (equation 1)

Referring to FIG. 5, if the pre-injection time Tp and the ignition time Ts are advanced while the pre-injection quantity is fixed, the combustion efficiency of the pre-injected fuel tends to decrease, and the unburned residue rate tends to increase consequently. Alternatively, it is possible to keep the combustion efficiency of the pre-injected fuel or the unburned residue rate constant by adjusting the pre-injection quantity and the degree of advancement of the pre-injection time Tp and the ignition time Ts. As described above, the combustion control according to the present invention can control the unburned residue rate of the pre-injected fuel, which is one of the factors of the pre-main correlation, by controlling the pre-injection quantity, the pre injection time Tp, and the ignition time Ts.

Returning back to FIG. 4, the main injection is performed at time Tm before the top dead center of the compression stroke after the portion Z1. Then, the main-injected fuel is ignited together with the unburned residue of the pre-injected fuel by flame generated by the pre-injected fuel and self-ignites to be burned by diffusion combustion. Consequently, the highest peak (second peak) of the rate of heat release occurs at a time past the top dead center of the compression stroke. As the main injection quantity increases, the highest value of the rate of heat release at the second peak increases, and the time of the peak retards. This means that the duration of the combustion of the main-injected fuel increases with increases in the main injection quantity, and therefore it is conjectured that the main-injected fuel and the unburned residue of the pre-injected fuel are subjected to diffusion combustion or combustion that can be regarded to be substantially equivalent to diffusion combustion.

Self-ignition occurring in the combustion control according to the present invention will be described with reference to FIG. 6. FIG. 6 shows the changes of the rate of heat release in the combustion chamber for two modes (L9, L10) among which the rate of the pre-injection quantity and the main injection quantity are varied, while the total injection quantity (i.e. the sum of the pre-injection quantity and the main injection quantity) in one cycle is kept constant. In the case shown in FIG. 6, the engine speed of the internal combustion engine 1 is 2000 rpm. The proportion of the pre-injection quantity is larger in mode L10 than in mode L9. In other words, the pre-injection quantity and the unburned residue of the pre-injected fuel are larger, while the main injection quantity is smaller, in mode L10 than in mode L9. As will be understood from FIG. 6, the peak value (the value of the aforementioned second peak) of the rate of heat release occurring after the top dead center of the compression stroke is higher in mode L10 than in mode L9. Moreover, the falling rate (the inclination of the curve in the graph) from the peak value of the rate of heat release is larger in mode L10 than in mode L9. It is conjectured that the above facts suggest that combustion of the main-injected fuel and the pre-injected fuel after the start of the main injection caused by self-ignition is more promoted (namely the proportion of fuel burned by self-ignition is larger, and the proportion of fuel burned by diffusion combustion is smaller) in mode L10 than in mode L9. In other words, it is considered that the unburned residue of the pre-injected fuel contributes to the promotion of self-ignition after the main injection. We verified that self-ignition is promoted if the combustion control according to the present invention is performed by controlling not only the pre-injection quantity but also the pre-injection time Tp and the ignition time Ts. As described above, in the combustion control according to the present invention, it is possible to promote self-ignition in burning the main-injected fuel and the pre-injected fuel by controlling a condition relating to the pre-injection and ignition.

As described above, the combustion control according to the present invention can attain a thermal efficiency that cannot be attained by prior arts, as shown in FIG. 7, by the above-described series of combustions with intervening ignition by the ignition plug 5 occurring in the period between the pre-injection and the main injection. FIG. 7 shows relationship between the engine load and the thermal efficiency (the upper graph (a)) and relationship between the engine load and the air-fuel ratio of the air-fuel mixture (the lower graph (b)) in the case where the engine speed of the internal combustion engine 1 is 2000 rpm. In graphs (a) and (b) of FIG. 7, curves L11 and L13 are for the combustion control according to the present invention, and curves L12 and L14 are for homogeneous stoichiometry control, which is conventional combustion control employed in gasoline engines. The homogeneous stoichiometry control is combustion control that controls the combustion in such a way that the air-fuel ratio of the air-fuel mixture in the combustion chamber becomes equal to an air-fuel ratio close to the stoichiometry homogeneously.

As will be understood from FIG. 7. in the combustion control according to the present invention, since main injection that causes self-ignition diffusion combustion to occur is performed after spray guide combustion caused by pre-injection and ignition by the ignition plug 5, the combustion according to this control is similar to what is called diesel combustion or can be regarded to be substantially equivalent to diesel combustion. Therefore, the air-fuel ratio of the air-fuel mixture in the combustion chamber is allowed to be extremely lean (in the exemplary case represented by curve L13 in FIG. 7(b), the air-fuel ratio is approximately between 20 and 70). In the combustion control according to the present invention, to realize combustion at such a lean air-fuel ratio, the degree of opening of the throttle valve 71 may be made larger than that in the conventional homogeneous stoichiometry control in gasoline engines. In consequence, pumping loss in the internal combustion engine 1 can be made smaller. Moreover, self-ignition diffusion combustion can make cooling loss in the internal combustion engine 1 smaller than that in the conventional homogeneous stoichiometry control in gasoline engines. Consequently, the thermal efficiency of the internal combustion engine 1 in which the combustion control according to the present invention is performed is very high.

<Detailed Description of the Combustion Control According to Present Invention>

As described above, the combustion control according to the present invention provides an advantageous effect that cannot be provided by prior arts as shown in FIG. 7 by performing pre-injection, ignition of the pre-injected fuel, and main injection having the pre-main correlation with the pre-injection. In the following the three technical factors in this combustion control, that is, (1) pre injection quantity, (2) injection interval, and (3) pre-injection time will be described in detail. These technical factors are considered to be highly relevant to the pre-main correlation, which is correlation between the pre-injection and the main injection.

(1) Pre-Injection Quantity

In the combustion control according to the present invention, pre-injection is performed at time Tp during the compression stroke as shown in FIG. 3. Therefore, combustion of pre-injected fuel ignited by the ignition plug 5 counteracts the engine power of the internal combustion engine 1. However, in the combustion control according to the present invention, the fuel burned in the combustion caused by the ignition is only a portion of the pre-injected fuel, and the counteracting effect to the engine power is small. The unburned residue of the pre-injected fuel that has not been burned in the combustion caused by the ignition is burned in self-ignition diffusion combustion together with main-injected fuel after the main injection to contribute to the engine power. As described above, the main injection performed at a proper injection time greatly contributes to the engine power of the internal combustion engine 1, but if the main injection quantity is large, there is a possibility that the self-ignition diffusion combustion may be affected by the evaporation latent heat of main-injected fuel to become unstable and that insufficiency of air (oxygen) around the fuel spray formed by the main injection may lead to an increase in the amount of generated smoke. For these reasons, a certain limit is placed on the amount of increase in the main injection quantity. Therefore, in order to respond to increases in the engine power, it is necessary to further increase the contribution of the pre-injection fuel. Thus, the pre-injected fuel and the main-injected fuel correlate with each other. The pre-injection quantity will be discussed in detail taking this fact into consideration.

(1-1) In Low Load State

In the low load state in which the engine load of the internal combustion engine 1 is relatively low, the total injection quantity or the sum of the pre-injection quantity and the main injection quantity is generally small. FIG. 8 shows relationship between the pre-injection quantity and the thermal efficiency of the internal combustion engine 1 in the low load state. In the illustrative case shown in FIG. 8, the relationship in a case where the pre-injection quantity is varied with the total injection quantity being fixed is shown. If the pre-injection quantity is small in the low load state, for example, if the pre-injection quantity is smaller than Mp1 in FIG. 8, the amount of heat generated by ignited combustion of the pre-injected fuel is so small that it is difficult for self-ignition and diffusion combustion of the main-injected fuel and the unburned residue of the pre-injected fuel to progress stably. Therefore, if the pre-injection quantity becomes smaller than Mp1, the thermal efficiency of the internal combustion engine 1 gradually decreases, and a misfire state in which the main-injected fuel cannot be ignited would arise eventually. In FIG. 8, the range of the pre-injection quantity in which combustion is unstable (i.e. the range below Mp1) is indicated as an unstable combustion range R1. To achieve stable combustion in the low load state, it is undesirable that the pre-injection quantity be smaller than Mp1.

If the pre-injection quantity is large in the low load state, for example, if the pre-injection quantity is larger than Mp2 in FIG. 8, combustion caused by ignition by the ignition plug 5 tends to be promoted, and consequently the unburned residue rate of the pre-injected fuel decreases. In other words, the proportion of the amount of unburned residue subjected to combustion after the main injection, which contributes to the engine power, decreases. Moreover, the main-injection quantity is decreased by an amount equal to the amount of increase in the pre-injection quantity. Therefore, the decrease in the engine power due to the decrease in the main-injected fuel becomes significantly large, even if the contribution of the unburned residue with the increased pre-injection quantity is taken into account. In FIG. 8, the range of the pre-injection quantity in which the thermal efficiency is deteriorated by a decrease in the engine power as described above (i.e. the range above Mp2) is indicated as a thermal efficiency deterioration range R2. To keep high thermal efficiency, it is undesirable that the pre-injection quantity be larger than Mp2.

FIG. 9 shows the changes of the pressure in the combustion chamber (L15 to L17) and the changes of the rate of heat release in the combustion chamber (L18 to L20) for three modes among which the pre-injection quantity is varied while the total injection quantity is the same when the internal combustion engine 1 is in the low load state. Specifically, in the graph of the changes of the pressure, the pre-injection quantity increases in the order of L15, L16, and L17. In the graph of the changes of the rate of heat release, the pre-injection quantity increases in the order of L18, L19, and L20. The pre-injection quantity is the same between L15 and L18, between L16 and L19, and between L17 and L20. When the pre-injection quantity is small, the heat generated by its combustion is small. Consequently, as shown in FIG. 9, the rise of the pressure in the combustion chamber is delayed (see L15), and the generation of heat with the main-injected fuel is also delayed (see L18). It can be seen from this that combustion is unstable. On the other hand, when the pre-injection quantity is large, the main-injection quantity is small, leading to a decrease in the engine power. Consequently, the pressure in the combustion chamber does not rise sufficiently (see L17), and the heat generated with the main-injected fuel is small (see L20).

From the above discussion follows that when the internal combustion engine 1 is in the low load state, it is preferred that the pre-injection be performed at a pre-injection quantity in the range Rp whose lower bound is defined by Mp1 and upper bound is defined by Mp2 (e.g. at the pre-injection quantity for L16 and L19 shown in FIG. 9). In the case where the thermal efficiency in the internal combustion engine 1 does not vary greatly in the range Rp as shown in FIG. 8, a certain value of the pre-injection quantity falling in the range Rp may be used as a representative pre-injection quantity in the low load state or the minimum pre-injection quantity. In this case, when the engine load of the internal combustion engine 1 increases in the low load state, the thermal efficiency of the internal combustion engine 1 can be kept high by increasing the main injection quantity while fixing the pre-injection quantity to the aforementioned representative value.

(1-2) High Load State

In the high load state in which the engine load of the internal combustion engine 1 is relatively high, the main injection quantity is increased to respond to the required engine load. However, if a large quantity of fuel is injected in the main injection performed at the proper injection time before the top dead center of the compression stroke, the effect of the evaporation latent heat of the injected fuel becomes notable. For example, it will be seen in portion Z2 indicated in FIG. 4 that as the main injection quantity increases, the rise of the rate of heat release with the main injection is delayed due to the effect of its evaporation latent heat. Thus, as the evaporation latent heat becomes large, the rise in the temperature in the combustion chamber is slowed down notably. Consequently, there is a possibility that self-ignition diffusion combustion of the unburned reside of the pre-injected fuel and the main-injected fuel becomes unstable. Moreover, when the main injection quantity is large, there is a possibility that insufficiency of air (oxygen) around the fuel spray formed by the main injection may lead to an increase in the amount of generated smoke. In view of this, in the high load state, it is preferred that an upper limit be set for the main injection quantity to make self-ignition diffusion combustion stable and to reduce the amount of smoke. To respond to increases in the engine load, the pre-injection quantity is increased while the main injection quantity is kept at the upper limit value. As described above, in the combustion control according to the present invention, there is the pre-main correlation between the pre-injection and the main injection, and the unburned residue of the pre-injected fuel contributes to the engine power. Therefore, even when it is not possible to increase the main injection quantity in the high load state, it is possible to respond to a requirement of increase of the engine load by increasing the pre-injected fuel and to increase its unburned residue.

Details of the correlation between the engine load of the internal combustion engine 1 and the pre-injected fuel will be described later.

(2) Injection Interval

In the combustion control according to the present invention, the pre-injection is performed at time Tp during the compression stroke, and the main injection is performed at time Tm before the top dead center of the compression stroke, as shown in FIG. 3. The interval of them (Tm-Tp) is defined as the injection interval Di. In the combustion control according to the present invention, the main injection is performed over flame generated by combustion of the pre-injected fuel and the unburned residue of the pre-injected fuel, so that self-ignition and diffusion combustion of the unburned residual fuel and the main injected fuel is brought about. Therefore, it is considered that the injection interval, which determines state of the flame generated by combustion of the pre-injected fuel and the unburned residue of the pre-injected fuel at the time of main injection, is one of the factors of the pre-main correlation. In this example, the injection interval is expressed or measured by a crank angle.

FIG. 10 shows relationship between the injection interval Di and the thermal efficiency of the internal combustion engine 1. In the illustrative case shown in FIG. 10, the relationship in a case where the injection interval Di is varied with the pre-injection quantity, the main injection quantity, and the ignition interval Ds being fixed is shown. In the combustion control according to the present invention, the main injection is performed subsequently to the pre-injection using one and the same fuel injection valve 6. The fuel injection valve 6 is generally configured to inject fuel through an injection port by lifting an injection needle provided inside. Therefore, there is a minimum feasible value Di1 of the injection interval necessitated by mechanical structural factors of the fuel injection valve 6 such as the time taken for the injection needle to move and return. In FIG. 10, the range of the injection interval that cannot be realized due to the mechanical structural factors of the fuel injection valve 6 (i.e. the range below Di1) is indicated as a mechanically limited range R3.

As the injection interval Di is increased, the time at which the main injection is performed comes closer to the end of the process of combustion caused by ignition of the pre-injected fuel. At the time close to the end, the combustion of the pre-injected fuel is about to end. In this circumstance, it is difficult for combustion of the main-injected fuel to be started by the flame of the pre-injected fuel. If the injection interval Di is further increased, there is a possibility that the main-injected fuel cannot be burned to lead to misfire. Consequently, if the injection interval Di is too long (e.g. in the range above Di2 in FIG. 10), the combustion control according to the present invention is not performed favorably, and the thermal efficiency of the internal combustion engine 1 will deteriorate. The range of the injection interval Di in which the thermal efficiency is deteriorated significantly is indicated as a heat efficiency deterioration range R4 in FIG. 10. The lower limit value (Di2 in FIG. 10) of the thermal efficiency decrease range R4 changes with the pre-injection fuel quantity. As the pre-injection fuel quantity increases, combustion of the pre-injected fuel started by ignition continues for a longer time. Consequently, combustion of the main-injected fuel can be started even if the injection interval Di is made longer.

As described above, it is preferred that the injection interval Di be set to an injection interval Di0 at which the thermal efficiency of the internal combustion engine 1 has a peak value, in a range Rd whose lower bound is defined by Di1 and upper bound is defined by Di2. Details of the relationship between the engine load of the internal combustion engine 1 and the injection interval Di will be described later.

(3) Pre-Injection Time Tp

In the combustion control according to the present invention, the main injection is performed after the pre-injection and ignition of the pre-injected fuel have been performed. Combustion of the main-injected fuel is started by flame of combustion of the pre-injected fuel, and the main-injected fuel self-ignites and is burned by diffusion combustion together with the unburned residue of the pre-injected fuel. In the early stage of combustion of the main-injected fuel, flame with the pre-injected fuel and the unburned residue thereof are distributed unevenly in the combustion chamber. In this circumstance, mixing of the main-injected fuel and air tends not to be promoted, and smoke is likely to be generated. Particularly in the case where the main injection quantity is large, smoke is likely to be generated. An increase in the amount of smoke leads to hindrance of efficient combustion of injected fuel, and the heat efficiency of the internal combustion engine 1 tends to decrease with increase in the amount of smoke. On the other hand, to improve the thermal efficiency of the internal combustion engine 1, it is preferred that the main fuel injection be performed at the proper injection time before the top dead center of the compression stroke. Thus, to reduce smoke, it is preferred to control the pre-injection time Tp in order to adjust interaction of the main-injected fuel and the unburned residue of the pre-injected fuel. Thus, it is considered that the pre-injection time Tp is also one of the factors of the pre-main correlation.

FIG. 11 shows relation between the amount of smoke generated and the pre-injection time Tp (see graph (b) of FIG. 11) and relation between the thermal efficiency and the pre-injection time Tp (see graph (c) of FIG. 11) for three modes (see diagram (a) of FIG. 11) among which the proportion of the pre-injection quantity and the main injection quantity is varied with the total injection quantity of the pre-injection and the main injection being fixed, where the main injection time Tm is fixed at a predetermined time before the top dead center of the compression stroke, and the pre-injection time Tp is changed. As for the ignition time, the ignition interval Ds (i.e. the period of time from the pre-injection time Tp to the ignition time Ts) is the same among all the modes. The proportions of the pre-injection quantity and the main injection quantity in modes 1 to 3 are as follows:

Mode 1: pre-injection quantity=X1, main injection quantity=Y1,
Mode 2: pre-injection quantity=X2, main injection quantity=Y2, and
Mode 3: pre-injection quantity=X3, main injection quantity=Y3,
where X1>X2>X3, Y1<Y2<Y3, and X1=Y1.

In graph (b) of FIG. 11, the change of amount of smoke in mode 1 is represented by L24, the change of amount of smoke in mode 2 is represented by L25, and the change of amount of smoke in mode 3 is represented by L26. In graph (c) of FIG. 11, the change of the thermal efficiency in mode 1 is represented by L27, the change of the thermal efficiency in mode 2 is represented by L28, and the change of the thermal efficiency in mode 3 is represented by L29. Measurement points of the smoke and the thermal efficiency in mode 1 are represented by circles, measurement points of the smoke and the thermal efficiency in mode 2 are represented by triangles, and measurement points of the smoke and the thermal efficiency in mode 3 are represented by rhombuses. The measurement points of the smoke and the thermal efficiency at the crank angle (or the pre-injection time Tp) at which the thermal efficiency becomes highest in the respective modes are represented by solid black circle, triangle, and rhombus.

Here, we consider shift from mode 3 to mode 2 and then to mode 1 while focusing on the aforementioned solid black measurement points. By increasing the pre-injection quantity and advancing the pre-injection time Tp, it is possible to keep the heat efficiency of the internal combustion engine 1 at around the highest level while reducing or keeping the amount of generated smoke (see graph (b) of FIG. 11). When the pre-injection quantity is increased, the main injection quantity is decreased contrary. However, by advancing the pre-injection time Tp, it is possible to increase the unburned residue of the pre-injected fuel. If a larger amount of unburned residual fuel is subjected to self-ignition diffusion combustion together with the main-injected fuel, a decrease in power due to decrease in the main injection quantity can be compensated for. Consequently, the thermal efficiency of the internal combustion engine 1 can be kept at satisfactory levels. Even if the pre-injection quantity is increased, it is possible to control the amount of smoke by advancing the pre-injection time Tp. This is considered to be because if the pre-injection time Tp is advanced, the pre-injection is performed at a time when the pressure in the combustion chamber is lower, making the penetrating force of the pre-injected fuel relatively higher, so that the pre-injected fuel is burned using air (oxygen) in the combustion chamber efficiently. Such efficient mixing of the pre-injected fuel and air can reduce unevenness in distribution of the unburned residue of the pre-injected fuel in the combustion chamber even if the pre-injection quantity is increased, and reduce the amount of smoke. Moreover, advancing the pre-injection time Tp leads to an increase in the injection interval, whereby overlapping of the unburned reside of the pre-injected fuel and the main-injected fuel can be prevented from occurring. Consequently, it is also possible to prevent generation of smoke due to local insufficiency of available air, which might arise if the unburned residue of the pre-injected fuel and the main-injected fuel overlap.

It will be understood that if it is assumed that the pre-injection is performed according to modes 1 to 3 while fixing the pre-injection time Tp to, for example, the time Ta at which the highest thermal efficiency is attained in mode 3 in graph (c) of FIG. 11, as the pre-injection quantity is increased, the amount of smoke increases and the thermal efficiency of the internal combustion engine 1 decreases. It will be understood from this fact also that the above-described way of controlling the pre-injection in which the injection time is advanced with increases in the pre-injected fuel is very effective in terms of reduction of smoke and improvement in the thermal efficiency. It is needless to say that it is necessary that advancing of the pre-injection be performed to an extent that allows the pre-main correlation to hold, and advancing the pre-injection time Tp unreasonably will make it difficult to burn the main-injected fuel favorably.

The measurement points in modes 1 to 3 shown in graphs (b) and (c) of FIG. 11 can be converted into plots in a graph having a horizontal axis representing the amount of generated smoke and a vertical axis representing the thermal efficiency of the internal combustion engine 1. FIG. 12 shows this interrelation of the amount of generated smoke and the thermal efficiency. The measurement points encircled by broken line R5 in FIG. 12 are in a range in which the amount of generated smoke is small and the thermal efficiency of the internal combustion engine 1 is high. The measurement points representing the highest thermal efficiency in the respective modes fall in this range R5. It will be adequately understood from this fact also that it is possible according to the present invention to reduce the amount of generated smoke while keeping the thermal efficiency of the internal combustion engine 1.

<Combustion Control Flow>

FIG. 13 shows the flow of a specific process of the combustion control according to the present invention in the internal combustion engine 1. The combustion control shown in FIG. 13 is performed repeatedly by executing a control program stored in the ECU 20 while the internal combustion engine 1 is operating. FIG. 14 shows exemplary control maps used in the process of the combustion control. In the upper graph (a) in FIG. 14, line L30 represents relationship between the engine load of the internal combustion engine 1 and the pre-injection quantity, line L31 represents relationship between the engine load and the main injection quantity, and line L32 represents relationship between the engine load and the load-adapted injection quantity, which is the fuel injection quantity adapted to the engine load. Moreover, the upper graph (a) in FIG. 14 also shows the unburned residue M1 of the pre-injected fuel in relation to the engine load. In the lower graph (b) in FIG. 14, L33 represents relationship between the engine load of the internal combustion engine 1 and the pre-injection time Tp, L34 represents relationship between the engine load and the ignition time Ts, and L35 represents relationship between engine load and the main injection time Tm. The horizontal axis of graph (b) in FIG. 14 represents the injection time, where larger values represent larger amount of advancement from the top dead center of the compression stroke.

Firstly in step S101, the engine load of the internal combustion engine 1 is calculated based on the measurement value of the accelerator position sensor 22. Alternatively, the engine load of the internal combustion engine 1 may be calculated based on the air flow rate in the intake passage 70, namely the measurement value of the air flow meter 72 or the intake air pressure in the intake passage 70. Then, in step S102, a load-adapted injection quantity S0 is determined based on the engine load calculated in step S101. Specifically, a load-adapted injection quantity S0 adapted to the engine load is calculated using the control map represented by line L32 in graph (a) of FIG. 14. In this example, the relationship between the engine load and the load-adapted injection quantity S0 is recorded in the control map in which the load-adapted injection quantity S0 increases as the engine load increases. After the completion of the processing of step S102, the process proceeds to step S103.

In step S103, the main injection time Tm is determined using the control map represented by line L35 in graph (b) of FIG. 14. As described above, in order to improve the thermal efficiency of the internal combustion engine 1, the main injection time Tm is set to the proper injection time before the top dead center of the compression stroke. The proper injection time of the internal combustion engine 1 has been measured by experiment conducted previously for every value of the engine load, and the control map represented by line L35 has been prepared based on the result of measurement. In an exemplary case, the main injection time Tm is gradually advanced as the engine load increases, but it is kept at an upper limit advancement amount in a high load range R8 (i.e. the range in which the load-adapted injection quantity S0 is equal to or larger than S2, which will be described later). This is because the main injection time Tm is determined in accordance with the main injection quantity, which is kept at a constant value (maximum main injection quantity) in the high load range R8 as will be described later. After the completion of the processing of step S103, the process proceeds to step S104.

In step S104, it is determined whether or not the load-adapted injection quantity S0 determined in step S102 is equal to or smaller than a predetermined first injection quantity S1. The predetermined first injection quantity S1 is a threshold value corresponding to an engine load above which there arises a situation in which smoke is likely to be generated because of insufficiency of available air due to overlapping of the unburned reside of the pre-injected fuel and the main injected fuel, if the pre-injection time Tp is advanced together with the main injection time Tm as described later (see the processing in step S106). Therefore, if the load-adapted injection quantity S0 is equal to or smaller than the predetermined first injection quantity S1, the internal combustion engine 1 is not in a situation in which smoke is likely to be generated. On the other hand, if the load-adapted injection quantity S0 exceeds the predetermined first injection quantity S1, the internal combustion engine 1 is in a situation in which smoke is likely to be generated. If the determination made in step S104 is affirmative, the process proceeds to step S105, and if negative, the process proceeds to step S110.

If the determination made in step S104 is affirmative, namely, if the load-adapted injection quantity S0 is equal to or smaller than the predetermined first injection quantity S1, the engine load of the internal combustion engine 1 is in a low load range R6 (see FIG. 14). In this case, in order to keep the thermal efficiency of the internal combustion engine 1 at high levels while preventing unstable combustion, it is preferred that the pre-injection quantity be set to an injection quantity falling in the range Rp as described above with reference to FIG. 8. Therefore, in step S105, the pre-injection quantity Sp is set to a minimum pre-injection quantity Spmin, which is a pre-injection quantity falling in the range Rp. Consequently, if the engine load is in the low load range R6, the pre-injection quantity Sp is fixed at the minimum pre-injection quantity Spmin as shown by line L30 in graph (a) of FIG. 14. After the completion of the processing in step S105, the process proceeds to step S106.

In step S106, the pre-injection time Tp is determined using the control map represented by line L33 in graph (b) of FIG. 14. In the low load range R6, the pre-injection time Tp may be set in such a way as to provide an injection interval Di that leads to an appropriate thermal efficiency taking into consideration correlation between the injection interval Di and the thermal efficiency of the internal combustion engine 1 that has been described with reference to FIG. 10. Therefore, since in the low load range R6 the pre-injection quantity is fixed at the minimum pre-injection quantity Spmin, the pre-injection time Tp is set in such a way that the injection interval Di is kept constant throughout the low load range R6, namely in such a way that the pre-injection time Tp is changed together with the main injection time Tm in the same manner. In step S107, the ignition time Ts is determined using the control map represented by line L34 in graph (b) of FIG. 14. Specifically, as with the pre-injection time Tp, the ignition time Ts is set in such a way that the ignition interval Ds is kept constant throughout the low load range R6 in adaptation to the fixation of the pre-injection quantity Sp to the minimum pre-injection quantity in the low load range R6.

In step S108, the main injection quantity Sm is calculated using the control map represented by line L31 in graph (a) of FIG. 14. In the low load range R6, the correlation between the engine load and the main injection quantity follows the following equation 2:

[Math.2]

$$Sm = S0 - Sp \times \alpha \qquad \text{(equation 2)},$$

where alpha is the unburned residue rate of the pre-injection fuel.

As described above, in the combustion control according to the present invention, the unburned residue of the pre-injected fuel self-ignites and is burned by diffusion combustion together with the main-injected fuel to contribute to the engine power, whereby the thermal efficiency of the internal combustion engine 1 can be improved. In terms of the contribution to the engine power, a portion of the pre-injection fuel or the unburned residue thereof can be regarded to be equivalent to the main-injected fuel. Therefore, it is possible to calculate the main injection quantity Sm taking into account characteristics of the combustion control according to the present invention by measuring the coefficient alpha representing the unburned residue rate of the pre-injected fuel in advance by an experiment or other process and using the aforementioned equation 2. As described above, the unburned residue rate of the pre-injected fuel changes depending on the pre-injection time, the ignition interval Ds, and the injection interval Di. Therefore, the value of the coefficient alpha is determined based on them. In cases where the quantity of fuel burned by ignition with the ignition plug 5 (i.e. the quantity of fuel burned by spray guide combustion) is very small relative to the total pre-injection quantity, the coefficient alpha may be set to be equal to 1 in the control. In this case, it is assumed in the control that the load-adapted injection quantity is equal to the total injection quantity. After the completion of the processing in step S108, the process proceeds to step S130.

As the parameters relating to pre-injection, main injection, and ignition are determined in the above-described manner, in the low load range R6, the unburned residue of the pre-injected fuel represented by M1 in graph (a) of FIG. 14 remains after the ignition of the pre-injected fuel. As described above, in the low load range R6, since the pre-injection quantity Sp is fixed at the minimum pre-injection quantity Spmin and the ignition interval Ds and the injection interval Di are also fixed, the amount of unburned residue of the pre-injected fuel is substantially constant.

If the determination made in step S104 is negative, the process proceeds to step S110. In step S110, it is determined whether or not the load-adapted injection quantity S0 determined in step S102 is equal to or smaller than a predetermined second injection quantity S2. The predetermined second injection quantity S2 is a threshold value corresponding to an engine load above which the quantity of fuel injected at the proper injection time in the gasoline engine is relatively so large that there arises a situation in which self-ignition diffusion combustion is likely to be affected by its evaporation latent heat to become unstable and smoke is likely to be generated because of insufficiency of air (oxygen) around its fuel spray. In other words, the predetermined second injection quantity S2 is the largest limit injection quantity that can be injected at the proper injection time in the gasoline engine in view of the stability of combustion and smoke. Therefore, if the load-adapted injection quantity S0 is equal to or smaller than the second injection quantity S2, there is a situation in which smoke is unlikely to be generated. On the other hand, if the load-adapted injection quantity S0 exceeds the predetermined second injection quantity S2, there is a situation in which smoke can be generated. If the determination made in step S110 is affirmative, the process proceeds to step S111, and if negative, the process proceeds to step S121.

If the determination made in step S110 is affirmative, namely if the load-adapted injection quantity S0 is larger than the predetermined first injection quantity S1 and equal to or smaller than the predetermined second injection quantity S2, the engine load of the internal combustion 1 is in a middle load range R7 (see FIG. 14). In this case process proceeds to steps S111 and S112. In step S111, the pre-injection quantity Sp is determined using the control map represented by line L30 in graph (a) of FIG. 14, and in step S112, the pre-injection time Tp is determined using the control map represented by line L33 in graph (b) of FIG. 14. Specifically, in the middle load range R7, the load-adapted injection quantity S0 is larger than the predetermined first injection quantity S1, and therefore it is necessary to reduce the generation of smoke resulting from interference of the unburned residue of the pre-injected fuel and the main-injected fuel. Therefore, as described before, the pre-injection time Tp is advanced further, in addition to the advancement made together with the advancement of the main injection time Tm by the same amount, in order to reduce the generation of smoke with increases in the engine load (i.e. increases in the load-adapted injection quantity S0). The pre-injection time Tp may be set appropriately taking into consideration the balance between the thermal efficiency and the amount of generated smoke based on both the relationship between the injection interval Di and the thermal efficiency of the internal combustion engine 1 described before with reference to FIG. 10 and the reduction of smoke described before with reference to FIG. 11. Thus, it is possible to reduce the generation of smoke without sacrificing the thermal efficiency of the internal combustion engine 1, by increasing the pre-injection quantity in accordance with an increase in the amount of advancement of the pre-injection time Tp as represented by line L30, thereby increasing the unburned residue of the pre-injected fuel and burning it with the main-injected fuel (see FIG. 11).

Then in step S113, the ignition time Ts is determined using the control map represented by line L34 in graph (b) of FIG. 14. Specifically, the amount of advancement of the ignition time Ts is increased by an amount same as the increase in the amount of advancement of the pre-injection time Tp determined in step S112 in response to the increase in the engine load. In other words, in the middle load range R7, the ignition time Ts is advanced in response to the increase in the engine load. After the completion of the processing in step S113, the process proceeds to step S114.

In step S114, the main injection quantity Sm is determined using the control map represented by line L31 in graph (a) of FIG. 14. In the middle load range R7 also, as with in the low load range R6, the relationship between the engine load and the main injection quantity Sm represented by line L31 follows the above-mentioned equation 2. Therefore, the main injection quantity Sm can be determined taking into account characteristics of the combustion control according to the present invention, as with in the processing of step S108. In the middle load range R7, since the pre-injection quantity Sp is increased with an increase in the engine load, the increase rate of the main injection quantity Sm (i.e. the rate of increase in the main injection quantity Sm relative to the increase in the engine load) in the middle load range R7 is smaller than the increase rate of the main injection quantity Sm in the low load range R6. After the completion of the processing of step S114, the process proceeds to step S130.

With the parameters relating to the pre-injection, main injection, and ignition determined as described above, the unburned residue of the pre-injected fuel represented by M1 in graph (a) of FIG. 14 remains after the ignition of the pre-injected fuel in the middle load range R7. As described above, in the middle load rage R7, the pre-injection quantity is increased in response to the increase in the engine load, and the pre-injection time Tp and the ignition time Ts are advanced with the ignition interval Ds being fixed. Consequently, the amount of unburned residue also increases with the increase in the engine load.

If the determination made in step S110 is negative, namely if the load-adapted injection quantity S0 is larger than the predetermined second injection quantity S2, the engine load of the internal combustion engine 1 is in the high load range R8 (see FIG. 14). In this case, the process proceeds to step 121. In step S121, the main injection quantity Sm is determined using the control map represented by line L31 in graph (a) of FIG. 14. Specifically, in the high load range R8, the main injection quantity Sm is made relatively large in response to the increase in the engine load. As described above, if the main injection quantity becomes somewhat large, combustion would become unstable due to the effect of evaporation latent heat during the injection, and smoke is likely to be generated due to insufficiency of air (oxygen) around injected fuel spray. In view of this, in the high load range R8, the main injection quantity Sm is set to a maximum main injection quantity Smmax, which is the upper limit of the main injection quantity with which stable combustion is ensured and the generation of excessively large amount of smoke can be prevented. After the completion of the processing of step S121, the process proceeds to step S122.

In step S122, the pre-injection quantity Sp is calculated using the control map represented by line L30 in graph (a) of FIG. 14. In the high load range R8, the relationship between the engine load and the pre-injection quantity Sp represented by line L30 is expressed by the following equation 3:

[Math.3]

$$Sp=(S0-Sm)/\alpha \quad \text{(equation 3)},$$

where alpha is the unburned residue rate of the pre-injection fuel, as with in equation 2. In the high load range R8, the main injection quantity Sm is fixed at the maximum main injection quantity Smmax for the above-described reason. Thus, by using the above equation 3, the pre-injection quantity Sp can be determined taking into account characteristics of the combustion control according to the present invention for essentially the same reason as in the processing of steps S108 and S114. After the completion of the processing in step S122, the process proceeds to step S123.

In step S123, the pre-injection time Tp is determined using the control map represented by line L33 in graph (b) of FIG. 14. Specifically, in the high load range R8, since the load-adapted injection quantity S0 is larger than the predetermined second injection quantity S2, the main injection quantity Sm is fixed at the maximum main injection quantity Smmax determined in step S121 in order to ensure stable combustion and to reduce smoke. Therefore, in response to required engine load, the pre-injection quantity Sp is determined to be a value larger than the values in the middle load range R7 according to the aforementioned equation 3. As the pre-injection quantity Sp becomes thus large, there arises again the possibility of the generation of smoke due to interference of the unburned residue of the pre-injected fuel and the main-injected fuel. Therefore, as seen from line L33 in graph (b) of FIG. 14, the pre-injection time Tp is advanced by more greatly than in the case where the engine load is in the middle load range R7, in other words, the pre-injection time Tp is set in such a way that the injection interval Di in the high load range R8 is increased with increases in the engine load, to thereby reduce smoke. Since there is the possibility of smoke generation in the high load range R8 as described above, it is preferred that the pre-injection time Tp be set appropriately giving a higher priority to reduction of smoke by the advancement described above with reference to FIG. 11. If the reduction of smoke can be achieved as desired, the pre-injection time Tp may be set appropriately taking into consideration the relationship between the injection interval Di and the thermal efficiency of the internal combustion engine 1 described above with reference to FIG. 10. After the completion of the processing of step S123, the process proceeds to step S124.

Then, in step S124, the ignition time Ts is determined using the control map represented by line L34 in graph (b) of FIG. 14. Specifically, the ignition time Ts is advanced with increases in the engine load, where the increase rate of the amount of advancement (i.e. rate of the increase in the amount of advancement to the increase in the engine load) is smaller than the increase rate of the amount of advancement of the pre-injection. Consequently, in the high load range R8, while both the pre-injection time Tp and the ignition time Ts are increased with increases in the engine load, the ignition interval Ds increases with increases in the engine load. Consequently, in the high load range R8, the amount of unburned residue of the pre-injected fuel, which is subjected to combustion together with the main-injected fuel, can be greatly increased (see M1 in graph (a) of FIG. 14). As described above, although the main injection quantity is fixed at the maximum main injection quantity in the high load range R8, it is possible to respond to the required engine load and to keep the thermal efficiency of the internal combustion engine 1 at satisfactory levels by increasing the amount of unburned residue of the pre-injected fuel in the above-described way. After the completion of the processing of step S124, the process proceeds to step S130.

With the parameters relating to the pre-injection, main injection, and ignition determined as described above, the unburned residue of the pre-injected fuel represented by M1 in graph (a) of FIG. 14 remains after the ignition of the pre-injected fuel in the high load range R8. As described above, in the high load rage R8, the pre-injection quantity Sp is increased in response to the increase in the engine load, and the pre-injection time Tp and the ignition time Ts are advanced with the ignition interval Ds being increased. Since the main injection quantity Sm is fixed at the maximum main injection quantity Smmax, the rate of increase in the pre-injection quantity Sp to the increase in the engine load is higher than in the case where the engine load is in the middle load range R7. Consequently, the amount of unburned residue increases with increases in the engine load more greatly than in the case where the engine load is in the middle load range R7.

After the completion of the processing of any one of the steps S108, S114, and S124, the processing of S130 is executed. In step S130, the pre-injection and the main injection by the fuel injection valve 6 and the ignition by the ignition plug 5 are performed according to the pre-injection quantity Sp, the pre-injection time Ts, the main injection quantity Sm, the main injection time Tm, and the ignition time Ts that have been determined in the foregoing processing. After the completion of the processing of step S130, the process starting from step S101 is performed again.

According to this combustion control, it is possible to achieve both stable diesel combustion with reduced smoke generation and improvement in the thermal efficiency of the combustion by appropriately determining the pre-injection quantity Sp, the pre-injection time Ts, the main injection quantity Sm, the main injection time Tm, and the ignition time Ts responsive to the engine load. Moreover, preferable combustion is realized over a wide operation range of the internal combustion engine ranging from the low load range to the high load range.

Example 2

A second example of control maps for the pre-injection, main injection, and ignition that can be applied to the combustion control shown in FIG. 13 will be described with reference to FIG. 15. In FIG. 15, control maps the same as those in FIG. 14 are denoted by the same reference numerals to eliminate detailed description of them. Specifically, in the control maps shown in FIG. 15, the divisions of the range of the engine load, or the low load range R6, the middle load range R7, and the high load range R8 are the same as those in FIG. 14. Moreover, the control maps for the pre-injection quantity Sp (represented by line L30), the main injection quantity Sm (represented by line L31), and the load-adapted injection quantity S0 (represented by line L32), and the control map for the main injection time (represented by line L35) are the same between FIGS. 14 and 15.

In the following, the control maps for the pre-injection time Tp (represented by line L36) and the ignition time Ts (represented by line L37) will be described for each of the load ranges.

(1) Low Load Range R6

In the low load range R6, the relationship between the engine load and the pre-injection time Tp and the relationship between the engine load and the ignition time Ts are the same as the control maps shown in FIG. 14.

(2) Middle Load Range R7

In this example, in the middle load range R7, the pre-injection time Tp is advanced together with the main injection time Tm by the same amount of advancement. Consequently, in the middle load range R7, the injection interval Di is kept constant as with in the low load range R6. On the other hand, the ignition time Ts is determined in such a way that the ignition interval Ds becomes longer as the engine load increases. Therefore, the ignition time Ts is retarded toward the top dead center of the compression stroke as the engine load increases. As the ignition interval Ds becomes longer, the quantity of the pre-injected fuel that flows in the combustion chamber until the ignition increases. Therefore, the amount of unburned residue of the pre-injected fuel after the ignition can be increased. Such an increase in the amount of unburned residue of the pre-injected fuel is advantageous for improvement of the thermal efficiency of the internal combustion engine 1, as described above.

(3) High Load Range R8

In this example also, in the high load range R8, the main injection quantity Sm is fixed at the maximum main injection quantity Smmax determined in step S121 in order to ensure stable combustion and to reduce smoke, and therefore the pre-injection quantity Sp is relatively large. Therefore, as is the case in the high load range R8 in the first example, in order to reduce smoke generated by interference of the unburned residue of the pre-injected fuel and the main-injected fuel, the pre-injection time Tp is advanced more greatly than in the middle load range R7. In other words, the pre-injection time Tp is set in such a way that the injection interval Di becomes longer with increases in the engine load in the high load range R8. The ignition time Ts may be advanced with increases in the engine load so that the ignition interval Ds becomes longer with increases in the engine load. Alternatively, the ignition time Ts may be fixed at a fixed time without regard to increases in the engine load.

As the pre-injection time Tp and the ignition time Ts are determined in the above-described way, the ignition interval Ds is increased by largely advancing the pre-injection time Tp in response to increases in the engine load. In consequence, the amount of unburned residue of the pre-injected fuel Tp can be increased effectively (see M1 in graph (a) of FIG. 15). In particular, since the main injection quantity is fixed at the maximum main injection quantity Smmax in the high load range R8 in order to ensure stable combustion and to reduce smoke, required engine load can be attained by increasing the amount of unburned residue of the pre-injected fuel in this way, and it is also possible to keep the thermal efficiency of the internal combustion engine 1 at satisfactory levels.

It is possible to achieve both stable diesel combustion with reduced smoke generation and improvement in the thermal efficiency of the combustion by appropriately determining the pre-injection quantity Sp, the pre-injection time Ts, the main injection quantity Sm, the main injection time Tm, and the ignition time Ts responsive to the engine load for the combustion control according to the present invention using the control maps shown in FIG. 15 as described above. Moreover, preferable combustion is realized over a wide operation range of the internal combustion engine ranging from the low load range to the high load range.

Example 3

In the examples described in the foregoing, the ignition time Ts is set to a time after the pre-injection time Tp. As an alternative to this mode, the ignition time Ts may be set to a time before the pre-injection time Tp, in this example. In this case, the pre-injection is performed while ignition by the ignition plug 5 is continuing, in other words, while discharge between the electrodes of the ignition plug 5 is continuing. Ignition by the ignition plug 5 is started at a predetermined time before the pre-injection time Tp, and the pre-injection is performed while the ignition is continuing, so that the pre-injected fuel is ignited. By starting ignition by the ignition plug 5 beforehand, the temperature of air around the region 5a shown in FIG. 2 can be raised, whereby the ignitability of the pre-injected fuel can be enhanced. Consequently, the reliability of the combustion control according to the present invention can be improved.

In the case of this example, the pre-injected fuel is ignited at the time when the pre-injected fuel reaches the region 5a of the ignition plug 5. Therefore, it is difficult to increase the amount of unburned residue of the pre-injected fuel by increasing the ignition interval Ds like in the case of the above-described examples. Therefore, when the amount of unburned residue of the pre-injected fuel is to be increased in order to improve the thermal efficiency of the internal combustion engine 1, the pre-injection quantity Sp may be increased. Moreover, if there is a possibility of the generation of smoke with the increase in the pre-injection quantity, the pre-injection time Tp may be advanced in addition to increasing of the pre-injection quantity Sp.

REFERENCE SIGNS LIST

1: internal combustion engine
2: cylinder
3: piston
5: ignition plug
6: fuel injection valve
7: intake port
8: exhaust port
9: intake valve
10: exhaust valve
20: ECU
21: crank position sensor
22: accelerator position sensor
71: throttle valve
72: air flow meter
Tp: pre-injection time
Tm: main injection time Ts: ignition time
Di: injection interval
Ds: ignition interval

The invention claimed is:

1. A control apparatus for an internal combustion engine comprising:
   a fuel injection valve capable of injecting gasoline as fuel into a combustion chamber of said internal combustion engine;
   an ignition plug whose position relative to the fuel injection valve is set in such a way that fuel spray injected through said fuel injection valve passes through an ignition-capable region and the ignition plug can spark-ignite the fuel spray directly; and
   a controller comprising at least one processor configured to perform pre-injection through said fuel injection valve at a predetermined pre-injection time during a compression stroke and main injection at such a predetermined injection start time before the top dead center of the compression stroke that enables combustion to be started by flame generated by combustion of pre-injected fuel after pre-spray formed by the pre-injected fuel is spark-ignited by said ignition plug, thereby causing a predetermined way of combustion in which self-ignition occurs and at least a portion of the main-injected fuel is burned by diffusion combustion, wherein when the quantity of said pre-injected fuel is increased, said controller advances said pre-injection time responsive to the increase in the quantity of said pre-injected fuel, thereby increases an injection interval between said pre-injection time and said predetermined injection start time of said main injection.

2. A control apparatus for an internal combustion engine according to claim 1, wherein responsive to the increase in the quantity of said pre-injected fuel, said controller advances said pre-injection time and increases an ignition interval between said pre-injection time and the time of ignition by said ignition plug.

3. A control apparatus for an internal combustion engine according to claim 2, wherein when the engine load of said internal combustion engine is equal to or higher than a predetermined first load, said controller increases the quantity of said pre-injected fuel in accordance with the increase in the engine load and advances said pre-injection time in accordance with the increase in the quantity of said pre-injected fuel.

4. A control apparatus for an internal combustion engine according to claim 3, wherein when the engine load of said internal combustion engine is equal to or higher than a predetermined second load higher than said first load, said controller increases the quantity of said pre-injected fuel in accordance with the increase in the engine load while keeping the quantity of said main-injected fuel at a predetermined upper limit quantity and advances said pre-injection time in accordance with the increase in the quantity of said pre-injected fuel.

5. A control apparatus for an internal combustion engine according to claim 1, wherein when the engine load of said internal combustion engine is equal to or higher than a predetermined first load, said controller increases the quantity of said pre-injected fuel in accordance with the increase in the engine load and advances said pre-injection time in accordance with the increase in the quantity of said pre-injected fuel.

6. A control apparatus for an internal combustion engine according to claim 5, wherein when the engine load of said internal combustion engine is equal to or higher than a predetermined second load higher than said first load, said controller increases the quantity of said pre-injected fuel in accordance with the increase in the engine load while keeping the quantity of said main-injected fuel at a predetermined upper limit quantity and advances said pre-injection time in accordance with the increase in the quantity of said pre-injected fuel.

* * * * *